US007226175B2

(12) United States Patent
Matsumoto et al.

(10) Patent No.: US 7,226,175 B2
(45) Date of Patent: *Jun. 5, 2007

(54) IMAGE EXPOSURE DEVICE AND LASER EXPOSURE DEVICE APPLIED THERETO

(75) Inventors: Kenji Matsumoto, Kanagawa (JP); Toshiro Hayakawa, Kanagawa (JP); Yoshinori Morimoto, Kanagawa (JP); Kiichi Kato, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/142,254

(22) Filed: Jun. 2, 2005

(65) Prior Publication Data

US 2005/0218413 A1 Oct. 6, 2005

Related U.S. Application Data

(62) Division of application No. 10/329,762, filed on Dec. 27, 2002, now Pat. No. 6,977,780.

(30) Foreign Application Priority Data

| Dec. 27, 2001 | (JP) | ............................. 2001-398416 |
| Dec. 27, 2001 | (JP) | ............................. 2001-398442 |
| Dec. 27, 2001 | (JP) | ............................. 2001-398443 |
| Nov. 18, 2002 | (JP) | ............................. 2002-333938 |
| Nov. 29, 2002 | (JP) | ............................. 2002-347742 |

(51) Int. Cl.
*G02B 27/00* (2006.01)

(52) U.S. Cl. ...................... 359/601; 359/566; 359/738; 372/50.11; 372/102

(58) Field of Classification Search ................ 359/566, 359/601–608, 719, 738, 613, 614, 568, 569, 359/572, 573; 372/50.11, 102
See application file for complete search history.

(56) References Cited

U.S. PATENT DOCUMENTS 5,912,872 A * 6/1999 Feldman et al. ......... 369/13.32

(Continued)

FOREIGN PATENT DOCUMENTS

| JP | 62-189483 | 8/1987 |
| JP | 63-006890 | 1/1988 |
| JP | 10-058749 | 3/1998 |
| JP | 2001-024230 | 1/2001 |

OTHER PUBLICATIONS

Shin-Ichi Nagahama, et al./High Power and Long-Lifetime InGaN Multi-Quantum-Well Laser Diodes Grow on . . . /Jpn. J.Appl. Phys. vol. 39, No. 7A, p. 1647 (2000).
Matsushita, Optronics, (2000) No. 1, p. 62.

*Primary Examiner*—Hung Dang
*Assistant Examiner*—Joseph Martinez
(74) *Attorney, Agent, or Firm*—Sughrue Mion, PLLC

(57) ABSTRACT

When a ratio R between a total angle $\phi$ of a widening angle in a median intensity of light of a light source (a GaN based semiconductor laser) and a total angle $2/\phi$ of a widening angle of light defining a numerical aperture NA of a collimator optical system (collimator lens) is defined as $R=(\sin^{-1}NA)\times 2/\phi$, the numerical aperture of the collimator optical system (collimator lens) is set so that $2.0 \geq R \geq 0.58$. Thus, an image exposure device is provided that can suppress stray light of a light source that emits a large amount of stray light.

16 Claims, 30 Drawing Sheets

U.S. PATENT DOCUMENTS

| | | |
|---|---|---|
| 5,923,636 A | 7/1999 | Haruguchi et al. |
| 5,954,424 A | 9/1999 | Anderson et al. |
| 6,278,548 B1 * | 8/2001 | Shimano et al. ............ 359/565 |
| 6,590,914 B1 * | 7/2003 | Tanase et al. ............ 372/38.02 |
| 6,614,720 B1 * | 9/2003 | Ogata et al. ............ 369/112.28 |
| 6,618,343 B1 * | 9/2003 | Saitoh et al. ........... 369/112.01 |
| 2001/0048063 A1 | 12/2001 | Yanagawa et al. |

* cited by examiner

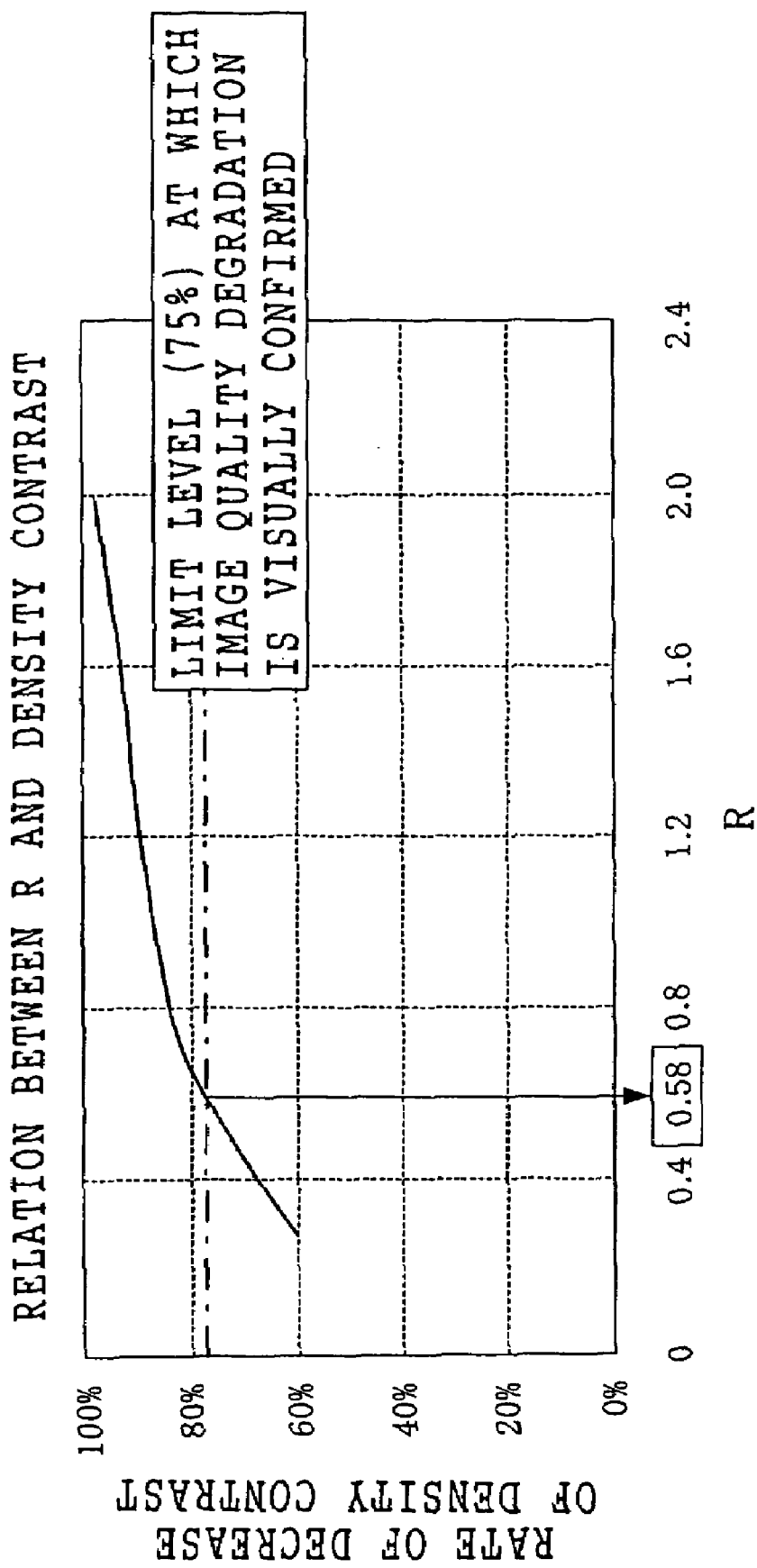

SCANNING DIRECTION ←

SPOT 194

BLURRY PATTERN 199

US 7,226,175 B2

IMAGE EXPOSURE DEVICE AND LASER EXPOSURE DEVICE APPLIED THERETO

This is a divisional of application Ser. No. 10/329,762 filed Dec. 27, 2002 now U.S. Pat. No. 6,977,780.

BACKGROUND OF THE INVENTION

1. Field of the Invention

The present invention relates to an image exposure device, particularly an image exposure device that is disposed with a GaN based semiconductor laser, modulates a laser beam, and scan-exposes a recording material such as photosensitive material with the laser beam, and to a laser exposure device applied thereto.

2. Description of the Related Art

Image exposure devices that scan a recording material with light and expose an image thereon using a light source device that includes an edge emitting LED (a super luminescent diode (SLD) or the like) or a semiconductor laser taking as a structural material AlGaInP, AlGaAs, or InGaAsP of a GaAs substrate shape have been proposed.

In light source devices that use such materials, GaAs, which serves as the substrate with respect to an emission wavelength, is an absorbent material, and light absorbent materials such as InGaAs are also used in opposing electrodes. For this reason, light ordinarily becomes independently closed off in an emission region of a few microns in width, and there is a relatively small amount of stray light outside of striped regions due to the effect of the absorbent materials.

The development of semiconductor lasers having a short oscillation wavelength (referred to below as "short-wavelength lasers"), such as blue-violet semiconductor lasers, has advanced steadily, and the utilization of GaN based semiconductor lasers is growing near at hand. In edge emitting LEDs or semiconductor lasers using GaN material, a material such as sapphire or SiC that is transparent with respect to the emission wavelength is used for the substrate. For this reason, stray light reaching the edges of the chip is returned to a vicinity of an active region by reflection, and stray light of various patterns is produced by plural reflections.

FIG. 15 is a pattern diagram showing a GaN based semiconductor laser 90 being used for a light source in a silver halide exposure device that spot-scans using a polygon or the like. As shown in FIG. 15, laser light emitted from the GaN based semiconductor laser 90 is collimated at a spot 194 of a predetermined size by a collimator lens 192. However, stray light (so-called EL light) 198, whose emission position and direction are random, cannot be collimated at the spot 194 and forms a blurry pattern 199.

FIG. 16 illustrates the relation between drive current and light output of the spot 194 and the relation between drive current and light output of the blurry pattern 199. As shown in FIG. 16, a large amount of power is present at the blurry pattern 199 in a region of about 0.05 mW low exposure intensity that is critical in silver halide exposure methods.

In comparison to electrophotographic methods using photosensitive materials such as photosensitive drums, the blurry pattern 199 becomes a fatal defect (i.e., the photosensitive material reacts due to the stray light) in high-resolution silver halide exposure methods, which have extremely high sensitivity. For example, when a pattern (e.g., the striped pattern shown in FIG. 17A) having a line width that is roughly the same as the diameter of the spot 194 is formed with a GaN based semiconductor laser, ordinarily an image is formed in stripes as shown in FIG. 17A.

However, as shown in FIG. 17B, coloration also occurs between the stripes due to the blurry pattern 199, and a remarkably degraded image whose sharpness has dropped and that is different from the expected image is formed.

Because the light amount of the blurry pattern resulting from the stray light is small, there are not many problems in area gradation such as in electrophotographic methods. However, in continuous-tone photosensitive materials such as those used in silver halide photography, a slight background leads to blurry characters and blurry images and remarkable degradation.

In exposure of silver halide methods, which are characterized by high-resolution images, it is necessary to reduce stray light that is inherent to GaN based semiconductor lasers and exerts an adverse, critical, and fatal impact on an image.

Exposure devices that expose photosensitive materials using a semiconductor laser are used for various purposes such as laser printing. In order to improve the quality of exposed images, it is effective to reduce as much as possible the spot diameter of the laser beam by reducing the wavelength itself of the laser light.

However, there is a problem in that, when a GaN based semiconductor laser is used for the light source in an exposure device, sharpness of the spot contour cannot be obtained due to the unintended stray light even if the beam diameter is reduced by operating the optical system. Particularly in silver halide methods, in which a continuous-tone high-resolution photographic image is formed by exposing a silver halide photosensitive material that is highly sensitive, lack of sharpness of the spot contour becomes a fatal problem in comparison to electrophotographic methods in which an image is structured by halftone dots.

For example, as shown in FIGS. 28A and 28B, when output light of a GaN based semiconductor laser 1 is collimated on a surface of a printing paper 3 by a lens 2, laser-oscillated laser light 4 forms a spot 5 of a predetermined size. However, a pattern 7 having a contour that lacks sharpness is formed by EL light 6 whose emission position, direction and wavelength are random. Power of about 0.1 mW is sufficient to expose a silver halide photosensitive material that is highly sensitive. However, as shown in FIG. 29, light intensity on the printing paper 3 is fairly large due to the EL light even in low exposure intensity regions where light intensity on the printing paper 3 is about 0.1 mW in the laser spot. For this reason, when a striped pattern having a line width that is equivalent to the diameter of a spot 5 shown in FIG. 30A is formed, areas between the stripes are exposed by the EL light 6 and, as shown in FIG. 30B, only images that have inferior clarity are obtainable.

SUMMARY OF THE INVENTION

The present invention was devised in consideration of the aforementioned problems. It is an object of the invention to provide an image exposure device that can limit stray light of a light source emitting a large amount of stray light.

It is another object of the invention to provide a light exposure device that can expose a photosensitive material to light in which EL light is reduced from output light of a gallium nitride semiconductor laser.

In order to achieve the aforementioned object, a first aspect of the invention is an image exposure device that uses a laser beam to scan-expose an image on photosensitive material, the image exposure device comprising: a GaN based semiconductor laser for emitting light that includes a laser beam and emission light other than the laser beam; and a lens through which the laser light emitted from the GaN based semiconductor laser is irradiated onto the photosensitive material, wherein when a numerical aperture of the lens is NA, setting of the NA is conducted so that a total angle $\phi$ of a widening angle of a median intensity of the laser beam emitted from the GaN based semiconductor laser satisfies $\phi \geqq (\sin^{-1}NA) \times 2$.

According to the first aspect of the invention, the laser beam emitted by the GaN based semiconductor laser (e.g., a GaN based semiconductor laser that emits a blue laser beam) is transmitted through the lens and irradiated on the photosensitive material to form a beam spot. Thus, an image is exposed. Because the GaN based semiconductor laser emits light other than the laser beam, stray light is emitted as described above. For this reason, when the laser beam is irradiated on the photosensitive material, stray light is also collimated around the beam spot.

Thus, the widening total angle of light defining the numerical aperture of the lens is set so that the widening total angle of the light defining the numerical aperture of the lens becomes equal to or less than the widening total angle of median intensity of the laser beam emitted from the GaN based semiconductor laser. That is, by making the widening total angle of light defining the numerical aperture of the lens smaller than the widening total angle of median intensity of the laser beam emitted from the GaN based semiconductor laser, it is possible to prevent stray light that is emitted equal to or greater than the widening total angle of median intensity of the laser beam emitted from the GaN based semiconductor laser from being transmitted through the lens. Therefore, it is possible to suppress light around the beam spot resulting from stray light emitted from the GaN based semiconductor laser and to improve the sharpness of the exposed image.

When a ratio R between the widening total angle $\phi$ defining the numerical aperture NA of the lens and the widening total angle $\phi$ of median intensity of the laser beam emitted from the GaN based semiconductor laser is defined as $R = (\sin^{-1}NA) \times 2/\phi$, it is prefer to conduct the aforementioned setting so that $2.0 \geqq R \geqq 0.58$.

That is, when the widening total angle defining the numerical aperture NA of the lens is made smaller than the widening total angle of median intensity of the laser beam emitted from the GaN based semiconductor laser, it is possible to obtain a modulation range necessary for exposure, but side lobes are generated at the beam profile of the GaN based semiconductor laser, whereby the exposed image becomes degraded. Thus, by providing a lower limit that does not adversely impact image quality, it is possible to secure a modulation range necessary for exposure and improve the sharpness of the exposed image.

A luminous flux limiter for limiting the luminous flux of the light may be disposed on the optical path of light emitted from the GaN based semiconductor laser, whereby it becomes possible to use the luminous flux limiter to suppress even further stray light irradiated on the photosensitive material.

Setting of the widening total angle of light defining the numerical aperture of the lens may be conducted by setting the numerical aperture of the lens itself, or by disposing a numerical aperture limiter for limiting the numerical aperture of the lens and setting the widening total angle of light defining the numerical aperture of the lens using the numerical aperture limiter. The limiting amount of the numerical aperture may be set by the transmittance area of a transmittance opening as a transmittance opening through which light is transmitted, or set by the reflectance area of a reflective mirror as a reflective mirror for reflecting light.

It is possible to use a silver halide photosensitive material having the characteristic of $3.5 \geqq \gamma \geqq 2.5$ as the photosensitive material.

In order to achieve the aforementioned object, a second aspect of the invention is an image exposure device that uses a laser beam to scan-expose an image on photosensitive material, the image exposure device comprising: a GaN based semiconductor laser for emitting light that includes a laser beam and emission light other than the laser beam; a drive for driving the GaN based semiconductor laser so that the light is emitted at an amount that is equal to or greater than an amount necessary to be able to expose the photosensitive material even if the light is reduced; and a limiter for limiting the light emitted from the GaN based semiconductor laser so that the light irradiated onto the photosensitive material is of an amount necessary for exposure, the limiter being disposed in an optical path of the light that is emitted from the GaN based semiconductor laser and irradiated onto the photosensitive material.

As shown in FIG. 16, the GaN based semiconductor laser (e.g., a GaN based semiconductor laser that emits a blue laser beam) has the characteristic of emitting an extremely large amount of stray light (blurry pattern). As shown in FIG. 16, whereas the light output of a light spot increases abruptly, there is little increase in the light output of stray light (blurry pattern) with respect to an increase in drive current. Thus, in the second aspect of the invention, even if light emitted from the GaN based semiconductor laser is reduced, the GaN based semiconductor laser is driven by the drive to that an amount of light equal to or greater than that capable of exposing the photosensitive material is emitted. That is, by driving the GaN based semiconductor laser as a light amount exceeding a light amount for exposing an image on the photosensitive material, it is possible for the percentage occupied by stray light included in light emitted from the GaN based semiconductor laser to be reduced in comparison to the light output of the light spot collimated on the photosensitive material.

Also, it is possible to conduct exposure at an proper light amount by the light irradiated on the photosensitive material being limited to a light amount necessary for exposure due to the limiter disposed on the optical path of the light emitted from the GaN based semiconductor laser and irradiated on the photosensitive material. That is, by increasing the drive current of the GaN based semiconductor laser and limiting the amount of light emitted from the GaN based semiconductor laser, stray light can be suppressed.

The limiter may be an optical system disposed on the optical path of light that is emitted from the GaN based semiconductor laser and irradiated on the photosensitive material. The limiter may also increase light loss of the optical system and limit the amount of light so that the light is limited to an amount necessary for exposure. The optical system can include as the limiter light filters and half mirrors.

The invention may be configured so that the drive drives the GaN based semiconductor laser at 0.5 mW or greater and the limiter limits 80% or more of the light emitted from the GaN based semiconductor laser.

Generally, it is necessary for the exposure surface light amount in a standard mini-laboratory to be 100 μW or less. Thus, the drive current drives the GaN based semiconductor laser at 0.5 mW or more, which generates an amount of light equal to or greater than the light amount necessary for exposure, and the limiter limits 80% or more of the 0.5 mW light amount, i.e., the light emitted from the GaN based semiconductor laser, whereby it is possible to obtain an exposure surface light amount necessary in a standard mini-laboratory (about 100 µW).

Using a silver halide photosensitive material as the photosensitive material, it is possible to apply the invention to an image exposure device in which exposure is conducted at an exposure resolution of 300 to 600 dpi and at a scanning speed of 500 to 1500 m/sec.

Also, the light amount can be limited by at least one of a density filter, a half mirror, a coated surface of the lens, and a reflective surface of a mirror.

In order to achieve the aforementioned object, a third aspect of the invention is a laser exposure device comprising: a semiconductor laser that comprises gallium nitride and emits stray light other than laser light when emitting laser light; and a diffraction unit for diffracting the laser light emitted from the semiconductor laser in a predetermined direction that is different from that of the stray light.

The semiconductor laser used in the light source of the laser exposure device comprises a gallium nitride material and emits stray light other than laser light when emitting the laser light. The diffraction unit diffracts laser light emitted from the semiconductor laser in a predetermined direction that is different from that of the stray light. Because the photosensitive material is exposed by this diffracted light, it is possible to expose the photosensitive material with a light in which stray light is reduced from the output light of the gallium nitride semiconductor laser.

The diffraction unit may be one that includes both the functions of diffracting laser light emitted from the semiconductor laser and spatially modulating the intensity of the diffracted light in correspondence to image data. For example, a diffraction unit that includes the function of controlling the gradient index or the shape of diffraction grooves and modulating the intensity of diffracted light can be used.

A spatial light modulator such as a grating light valve (GLV) can be used as the diffraction unit including the function of controlling the shape of diffraction grooves and spatially modulating the intensity of the diffracted light. The GLV comprises solid micro elements having formed thereon a first reflective surface and moveable micro elements having formed thereon a second reflective surface that are alternatingly disposed along a predetermined direction on a substrate surface. When an electrostatic force corresponding to a modulation signal acts, the moveable micro elements move, the distance between the first reflective surface and the second reflective surface is altered, and incident light of a predetermined wavelength is diffracted in a predetermined direction by an interference effect.

It is possible to use an acoustooptic modulator as the diffraction unit including the function of controlling the gradient index and spatially modulating the intensity of the diffracted light. When an acoustooptic modulator is used, the thickness of the portion on which the gradient index is formed is preferably 0.05 mm to 0.1 mm.

It is preferable to dispose the semiconductor laser so that the electric field faces a direction substantially orthogonal to an effective diffraction grating surface of the diffraction unit. By making the electric field incident on the diffraction grating surface, diffraction efficiency is maximized. Also, a spatial light modulator that is separate from the diffraction unit for diffracting laser light and spatially modulates the intensity of the diffracted light can also be disposed between the semiconductor laser and the photosensitive material.

Particularly remarkable effects can be obtained when the laser exposure device of the invention is applied to a highly sensitive photosensitive material that is exposed by density gradation, such as a silver halide photosensitive material.

BRIEF DESCRIPTION OF THE DRAWINGS

FIG. 9 is a graph showing the relation between the ratio R and density contrast;

FIG. 15 is a pattern diagram when a GaN based semiconductor laser is used as a light source in a silver halide exposure device for spot-scanning using a polygon or the like;

DESCRIPTION OF THE PREFERRED EMBODIMENTS

First Embodiment

An example of a first embodiment of the invention will be described in detail below with reference to the drawings. It should be noted that the present embodiment is one in which the invention is applied to a digital laboratory system.

(Schematic Description of Overall System)

Figure 1:
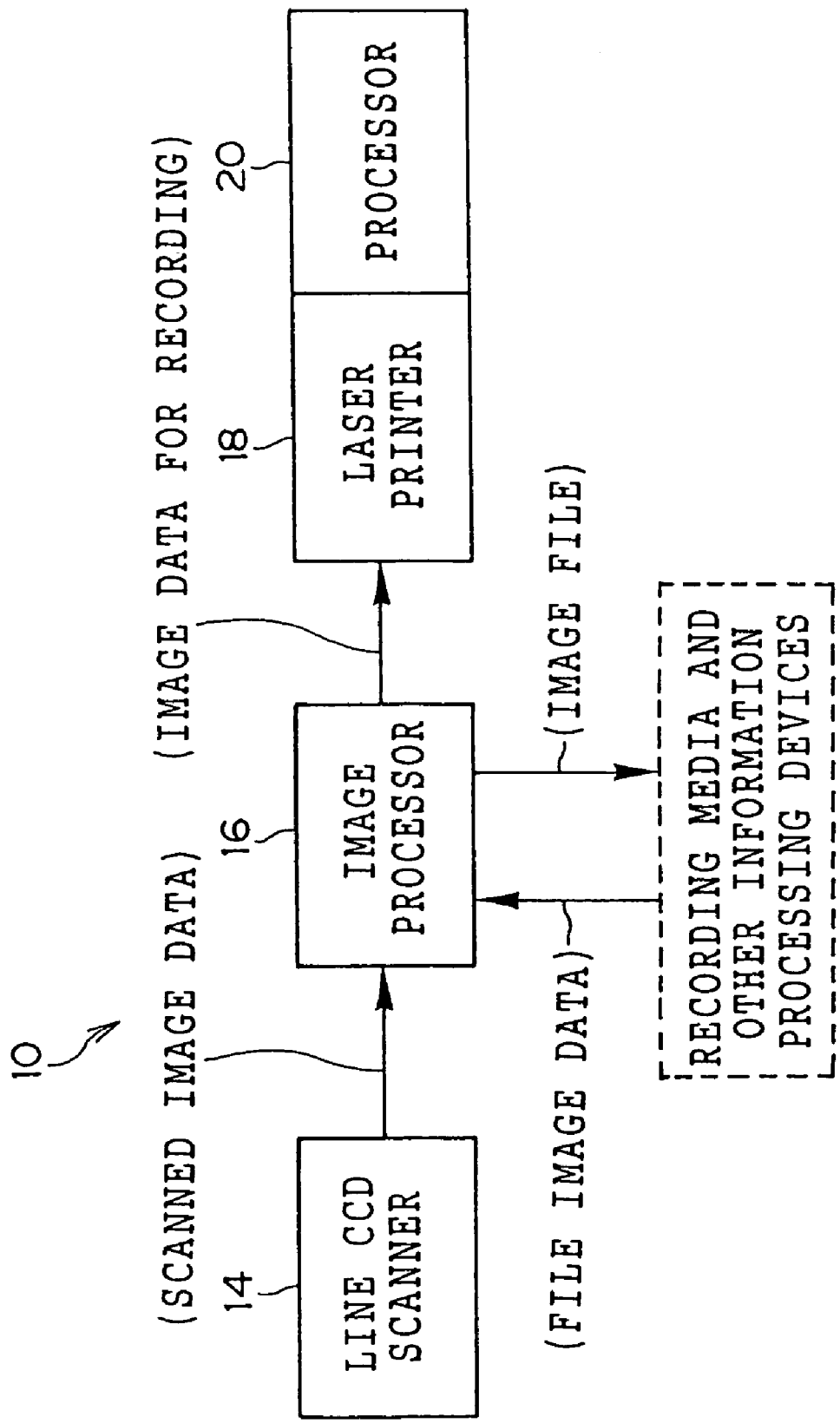
FIG. 1 is a block diagram showing the schematic structure of a digital laboratory system pertaining to an embodiment of the invention.
Figure 2:
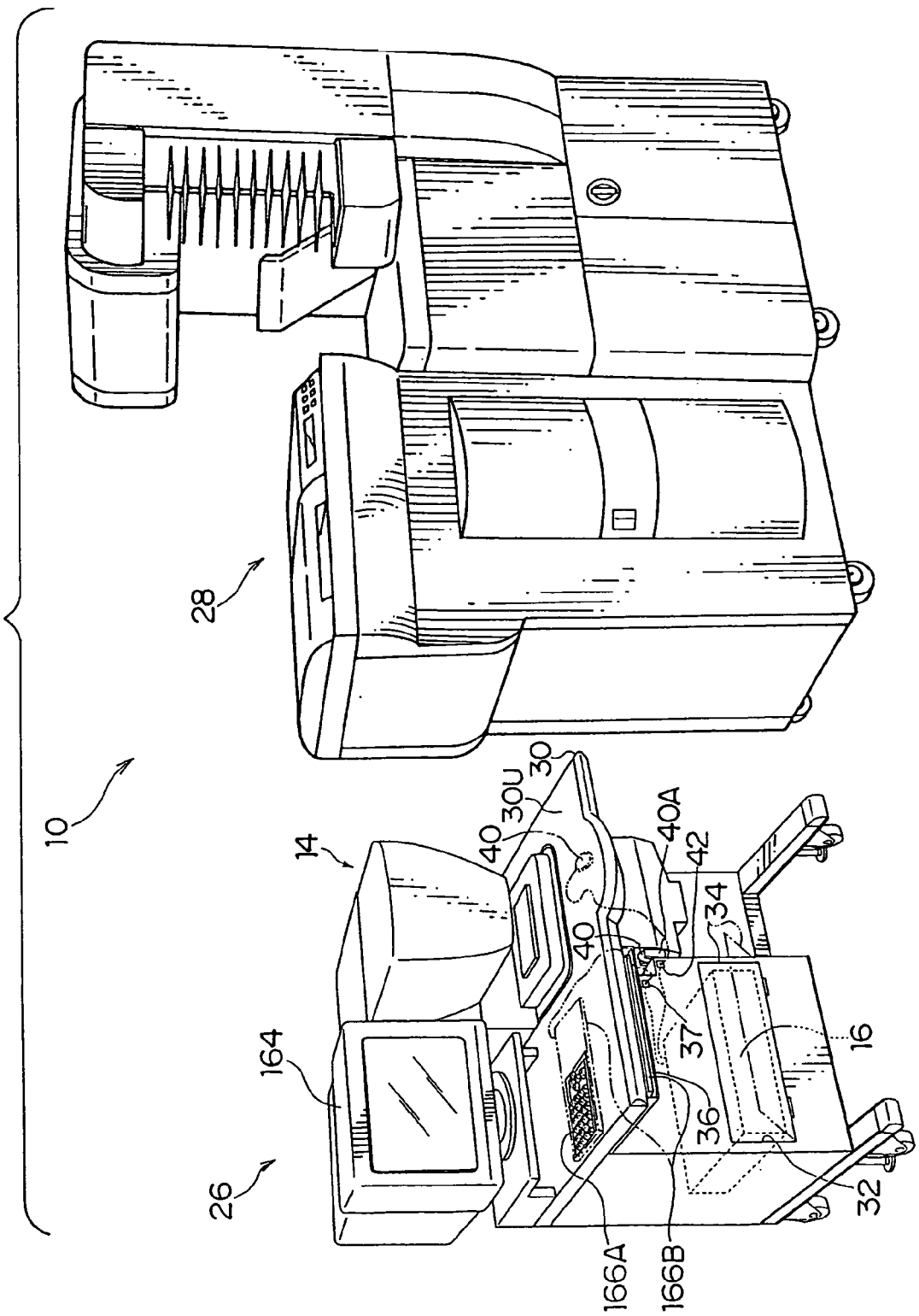
FIG. 2 is an oblique perspective view showing an outer appearance of the digital laboratory system pertaining to the embodiment of the invention.

FIG. 1 shows the schematic structure of a digital laboratory system 10 pertaining to an embodiment of the invention, and FIG. 2 shows the digital laboratory system 10 in perspective view. As shown in FIG. 1, the digital laboratory system 10 comprises a line CCD scanner 14, an image processor 16, a laser printer 18 that serves as an image exposure device, and a processor 20. As shown in FIG. 2, the line CCD scanner 14 and the image processor 16 are integrated as an input section 26, and the laser printer 18 and the processor 20 are integrated as an output section 28.

The line CCD scanner 14 is for reading a film image (a negative image or a positive image visualized by developing and processing material on which a shot subject has been recorded) recorded on photographic photosensitive material (referred to below simply as "photographic film") such as photographic film (e.g., negative film or reversal film). For example, film images of 135 mm photographic film, 110 mm photographic film and photographic film in which a transparent magnetic layer is formed (240 mm photographic film: so-called APS film), 120 mm and 220 mm (brownie size) photographic film can be the reading target. The line CCD scanner 14 reads a film image of the aforementioned reading target with a 3-line color CCD and outputs R, G and B image data.

As shown in FIG. 2, the line CCD scanner 14 is mounted on a work table 30. The image processor 16 is housed within a housing 32 disposed below the work table 30. An open/close door 34 is mounted at an opening in the housing 32. The interior of the housing 32 is ordinarily covered by the open/close door 34. The interior is exposed by swinging the open/close door 34 open, whereby it becomes possible to remove the image processor 16.

A display 164 is mounted at a far side of the work table 30, and two kinds of keyboards 166A and 166B are disposed. The keyboard 166A is disposed in the work table 30. The keyboard 166B is stored within a drawer 36 of the work table 30 when not in use, and removed from the drawer 36 and superimposed on the keyboard 166A when in use. When the keyboard 166B is in use, a connector (not illustrated) attached to an end of a cord (signal line) that extends from the keyboard 166B is connected to a jack 37 disposed in the work table 30, whereby the keyboard 166B is electrically connected to the image processor 16 via the jack 37.

A mouse 40 is disposed on a work surface 30U of the work table 30. The mouse 40 is connected to the image processor 16 by a cord (signal line) that extends into the housing 32 through a hole 42 disposed in the work table 30. The mouse 40 is stored in a mouse holder 40A when not in use, and removed from the mouse holder 40A and disposed on the work surface 30U when in use.

Image data (scanned image data) outputted from the line CCD scanner 14 is inputted to the image processor 16. It is also possible for image data obtained by shooting with a digital camera, image data obtained by reading an original (e.g., a reflection original) other than a film image with a scanner, and image data generated by a computer (all of these image data will be collectively referred to below as file image data) to be inputted to the image processor 16 from the outside (e.g., inputted through a storage medium such as a memory card, or inputted from other information processing devices through communication lines).

The image processor 16 carries out image processing such as various corrections with respect to image data inputted thereto, and inputs the image data to the laser printer 18 as image data for recording. The image processor 16 can also output image-processed image data to the outside as an image file (e.g., output image-processed image data to an information storage medium such as a memory card, or send image-processed image data to other information processing devices through communication lines).

The laser printer 18 is disposed with R, G and B laser light sources, irradiates printing paper with laser light modulated in response to the image data for recording inputted from the image processor 16, and records an image (latent image) on the printing paper by scan-exposing the printing paper. The processor 20 carries out processing such as color development, bleach-fixing, rinsing, and drying of the printing paper on which an image has been recorded by the laser printer 18 scan-exposing the printing paper. Thus, an image is formed on the printing paper.

(Detailed Structure of the Laser Printer)

Figure 3:
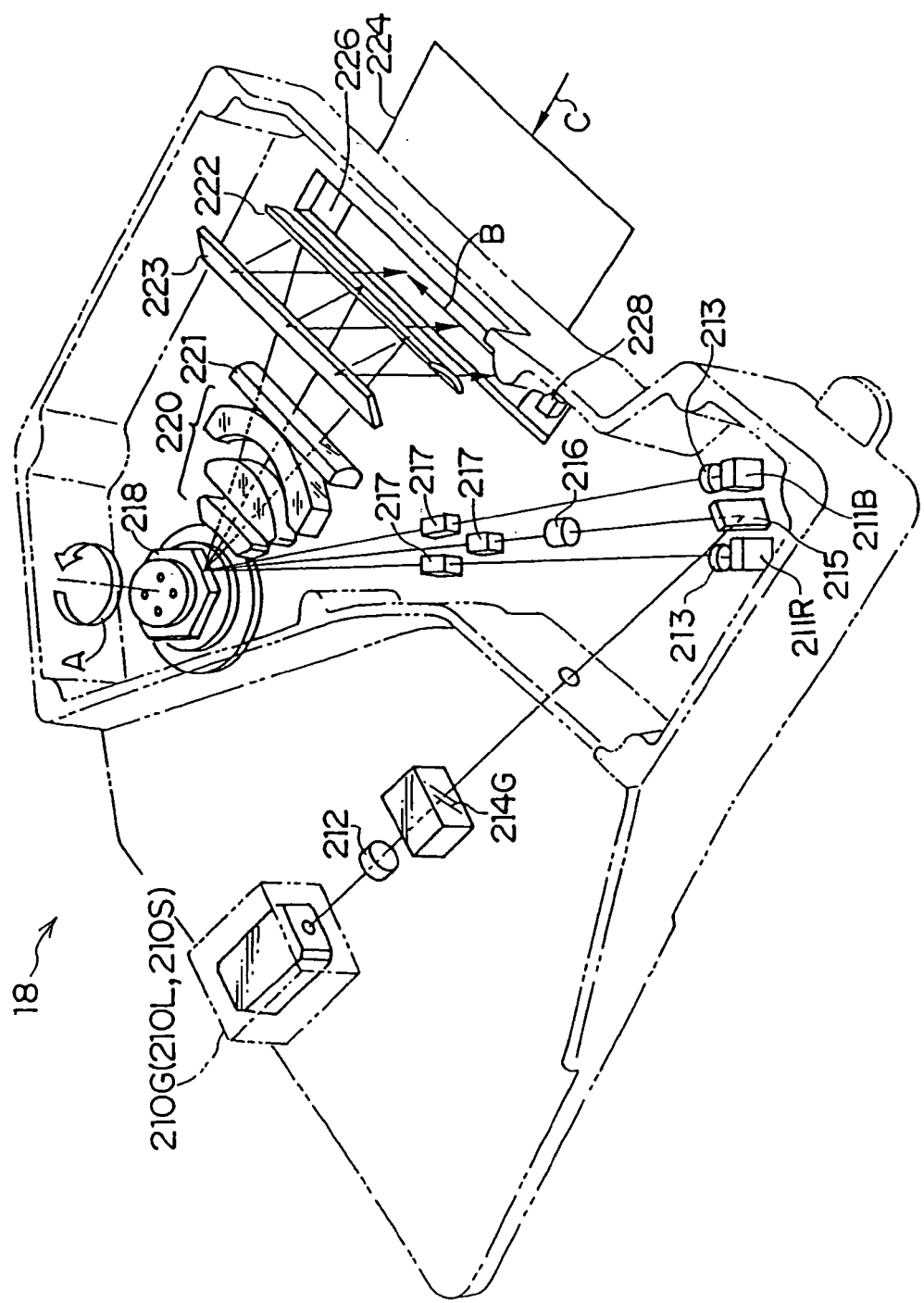
FIG. 3 is an oblique perspective view showing the schematic structure of a laser printer.

The structure of the laser printer 18 will next be described in detail. The structure of an optical system of the laser printer 18 is shown in FIG. 3.

The laser printer 18 is disposed with three laser light sources—a laser light source 211R, a laser light source 210Q and a laser light source 211B. The laser light source 211R comprises a semiconductor laser (LD) that emits laser light (referred to below as R laser light) of an R wavelength (e.g., 685 nm). The laser light source 210G comprises an LD 210L that serves as a laser light emitter and a wavelength conversion element (SHG) 210S that serves as wavelength converter for converting laser light emitted from the LD 210L to laser light of ½ the wavelength thereof. The oscillation wavelength of the LD 210L is determined so that laser light (referred to below as G laser light) of a G wavelength (e.g., 532 nm) is emitted from the SHG 210S. The laser light source 211B comprises an LD that emits laser light (referred to below as B laser light) of a B wavelength (e.g., 440 nm).

A collimator lens 212 and an acoustooptic modulator (AOM) 214G that serves as an outside modulator are successively disposed at a laser light emission side of the laser light source 210G The AOM 214G is disposed so that laser light made incident thereon passes through an acoustooptic medium, and is connected to an AOM driver (not illustrated). When a high-frequency signal is inputted from the AOM driver, an ultrasonic wave corresponding to the high-frequency signal is propagated through the acoustooptic medium, diffraction occurs due to an acoustooptic effect acting on the laser light passing through the acoustooptic medium, and laser light of a strength corresponding to the amplitude of the high-frequency signal is emitted from the AOM 214G as diffracted light.

A flat mirror 215 is disposed at a laser light emission side of the AOM 214G, and a spherical lens 216, a cylindrical lens 217, and a polygon mirror 218 are successively disposed at a laser light emission side of the flat mirror 215. G laser light that is emitted from the AOM 214G as diffracted light is reflected by the flat mirror 215, reflected to a predetermined position on a reflective surface of the polygon mirror 218 via the spherical lens 216 and the cylindrical lens 217, and then reflected by the polygon mirror 218.

A collimator lens 213 and a cylindrical lens 217 are successively disposed at laser light emission sides of the laser light sources 211R and 211B. Laser light emitted from the laser light sources 211R and 211B is collimated by the collimator lenses 213, irradiated on substantially the same position as the aforementioned predetermined position on the reflective surface of the polygon mirror 218 via the cylindrical lenses 217, and reflected by the polygon mirror 218.

Three laser lights of R, G, and B reflected by the polygon mirror 218 successively pass through an f θ lens 220 and a cylindrical lens 221, are reflected by a cylindrical mirror 222, reflected substantially vertically downwards by an angled mirror 223, and irradiated on printing paper 224 via an opening 226. It should be noted that the angled mirror 223 may be omitted so that the laser lights are directly reflected substantially vertically downwards by the cylindrical mirror 222 and irradiated on the printing paper 224.

A scanning initiation detection sensor (referred to below as an SOS detection sensor) 228 that detects R laser light arriving through the opening 226 is disposed near a position at which scan-exposure is initiated on the printing paper 224. The reasons that the laser light that the SOS detection sensor 228 detects is R laser light are because the printing paper is least sensitive to R laser light and R laser light can be reliably detected because the light amount of R laser light is maximized, and because R laser light reaches the SOS detection sensor 228 most quickly in scanning by the rotation of the polygon mirror 218. In the present embodiment, the signal outputted from the SOS detection sensor 228 (referred to below as the sensor output signal) is ordinarily at a low level and reaches a high level only when R laser light is detected.

Figure 4:
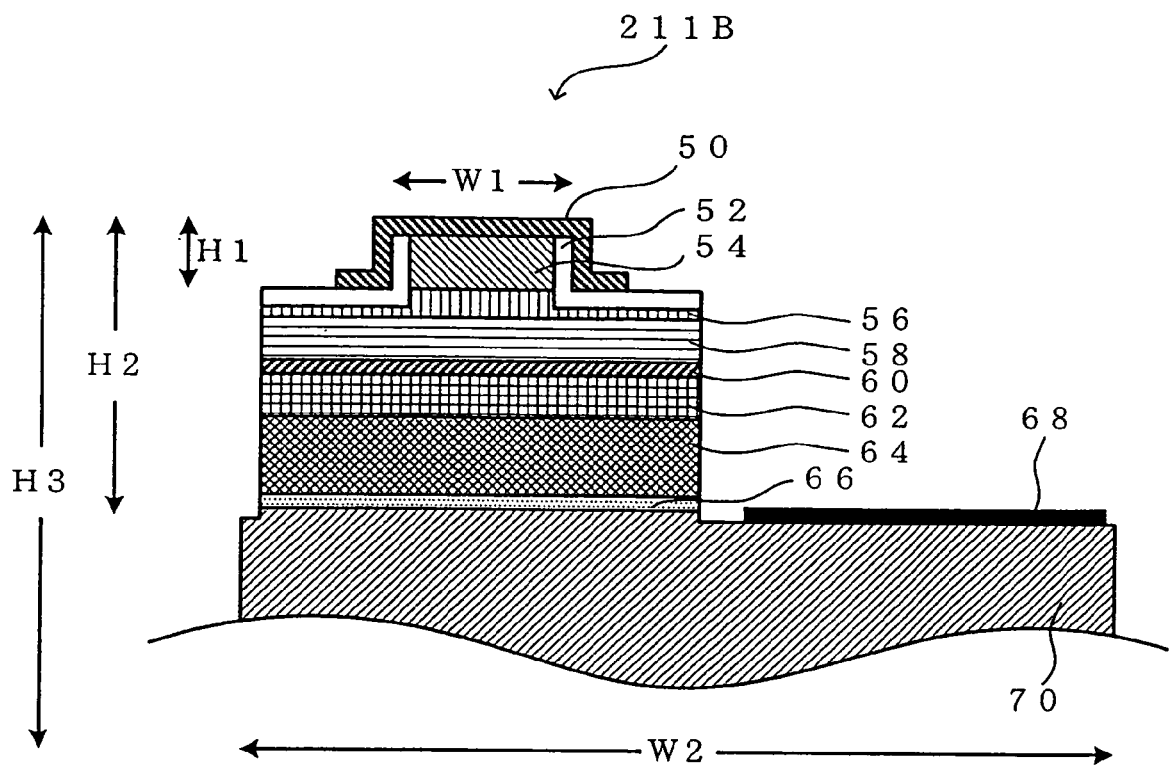
FIG. 4 is a cross sectional pattern diagram showing the detailed structure of a GaN based semiconductor laser.

The detailed structure of the laser light source 211B pertaining to the present embodiment will next be described. FIG. 4 is a cross sectional pattern diagram of the laser light source 211B pertaining to the embodiment of the invention. It should be noted that, in FIG. 4, W1=1.7 μm, W2=300 μm, H1=about 0.9 μm, H2=about 3.5 μm, and H3=100 μm.

The laser light source 211B comprises a InGaN based semiconductor laser. As shown in FIG. 4, a low-defect GaN substrate layer is formed on a sapphire c surface substrate (by a method disclosed in S. Nagahama, et. al., Jpn. Appl. Phys. Vol. 39, No. 7A, p. L347 (2000)).

Next, using MOCVD at atmospheric pressure, an n-GaN buffer layer (Si-doped, 5 μm) 70, an n-In 0.1 Ga 0.9 N buffer layer (Si-doped 0.1 μm) 66, an a-A 10.1 Ga 0.9 N cladding layer (Si-doped, 0.45 μm) 64, an n-GaN light guide layer (Si-doped, 0.04 to 0.08 μm) 62, an undoped active layer 60, a p-GaN light guide layer (Mg-doped, 0.04 to 0.08 μm) 58, a p-A 10.1 Ga 0.9 N cladding layer (Mg-doped, 0.45 μm) 56, and a p-GaN capping layer (Mg-doped, 0.25 μm) are deposited. The active layer 60 is a double quantum well structure of undoped In 0.05 Ga 0.95 N (10 nm), undoped In 0.23 Ga 0.77 N quantum well structure (3 nm), undoped In 0.05 Ga 0.95 (5 nm), undoped In 0.23 Ga 0.77 N quantum well structure (3 nm), undoped In 0.05 Ga 0.9 N (10 nm), undoped A 10.1 Ga 0.9 N (10 nm). Next, a resist ripe of about 1.7 μm is etched and formed by reactive ion beam etching (RIBE) using chlorine ions at a distance of 0.1 μm from the p-GaN light guide layer 58 in the p-A 10.1 Ga 0.9 N cladding layer by photolithography and etching. Next, an SiN film 52 is formed over the entire surface by plasma CVD, and unnecessary portions on the ridge are removed by photolithography and etching. Thereafter, p-type impurities are activated by heating in a nitrogen gas atmosphere. Thereafter, the epilayer other than portions including light emission regions are etched and removed by RIBE using chlorine ions until the n-GaN buffer layer 70 is exposed. Thereafter, Ti/Al/Ti/Au, serving as an n-electrode 68, and Ni/Au, serving as a p-electrode 50, are vacuum-evaporated and annealed in nitrogen to form ohmic electrodes. Resonator ends are formed by cleavage. In the present embodiment, the oscillation wavelength is 440 nm, and the beam emission angle median total angle in a direction orthogonal to the junction is 34 degrees. It should be noted that it is also possible to use a sapphire substrate of an insulator. It is also possible to produce a similar structure on a conductive substrate such as SiC. Moreover, it is also possible to reduce translocation of oscillation stripe regions using epitaxially lateral over growth (ELOG) (reference document: Matsushita, *Optronics,* (2000) No. 1, p. 62).

Figure 5:
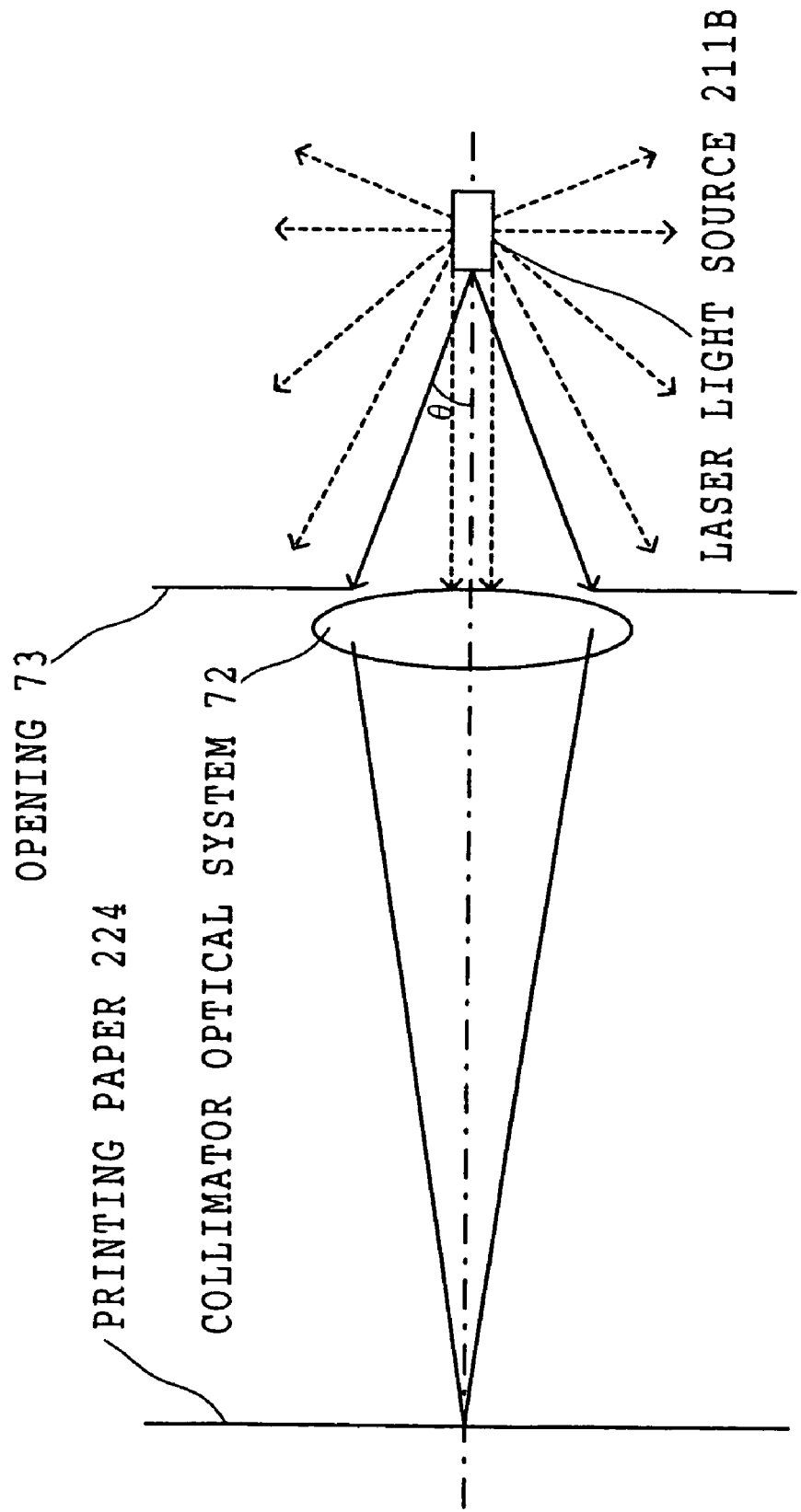
FIG. 5 is a pattern diagram showing an optical system of the GaN based semiconductor laser.

Next, the optical system of the laser light source (the aforementioned GaN based semiconductor laser) 211B pertaining to the present embodiment will be described in detail. FIG. 5 is a pattern diagram showing the optical system of the GaN based semiconductor laser. In FIG. 5, in order to simplify the optical system of the GaN based semiconductor laser, a collimator optical system 72 is shown as an optical system including the collimator lenses 213, the cylindrical lenses 217, the polygon mirror 218, the f θ lens 220, the cylindrical lens 221, the cylindrical mirror 222, and the angled mirror 223.

As shown in FIG. 5, B laser light emitted from the laser light source 211B is irradiated on the printing paper 224 via the collimator optical system 72. Although B laser light is irradiated on the printing paper 224 using the GaN based semiconductor laser in the present embodiment, as mentioned above, the laser light source 211B comprising the GaN based semiconductor laser includes the characteristic of emitting an extremely large amount of stray light. Therefore, blurring resulting from the stray light arises at the beam spot periphery irradiated on the printing paper 224 and image quality is lowered by the stray light.

Thus, in the present embodiment, in order to limit stray light emitted from the laser light source 211B, a numerical aperture NA of the collimator optical system 72 (in the present embodiment, the collimator lenses 213) is limited. It should be noted that limitation of the numerical aperture NA may be conducted by changing the numerical aperture of the collimator lenses 213 themselves, or by disposing an opening 73 through which laser light passes at the laser light incidence side of the collimator lens 213, as shown in FIG. 5. In the latter case, it is possible to limit the numerical aperture using the area of the opening.

Figure 6A:
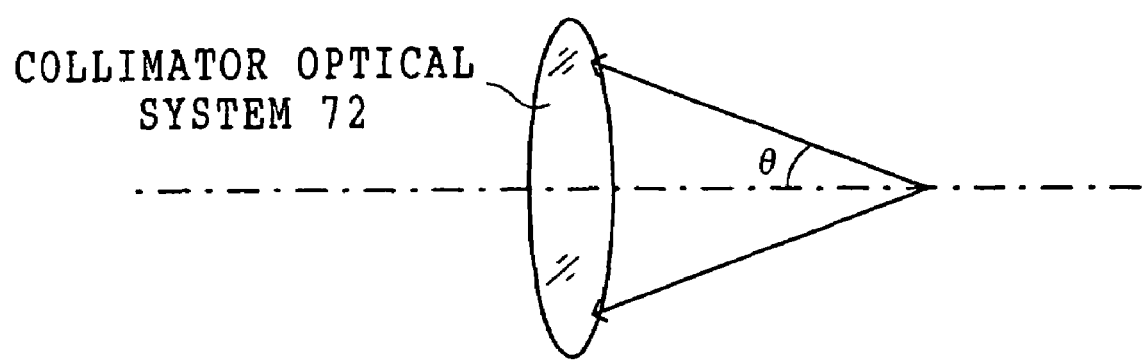
FIG. 6A is a diagram showing θ defining a numerical aperture.
Figure 6B:
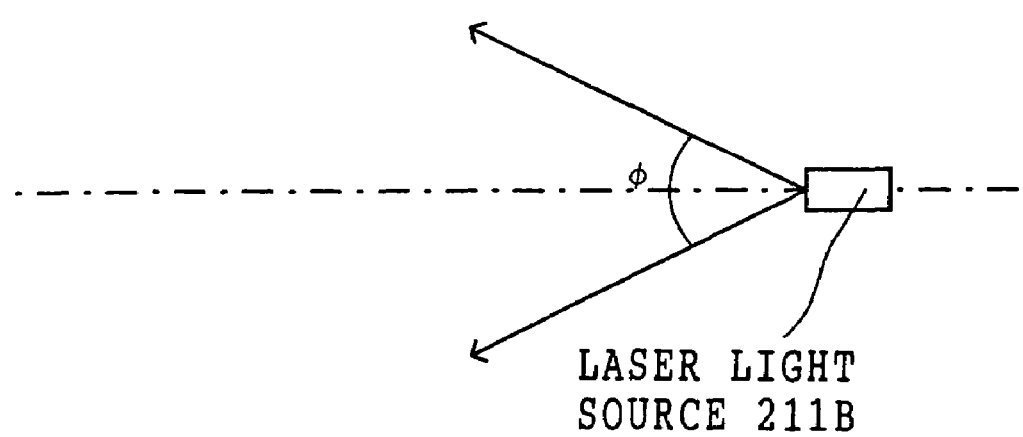
FIG. 6B is a diagram showing a total angle φ of an angle in a median intensity of light of a laser light source.

Because, as shown in FIG. 6A, the numerical aperture NA of the lens is generally defined as NA=n×sin θ (where n=1 assuming a refractive index and within the air) when the half angle of the aperture angle is θ, the half angle θ of the widening angle of the light defining the numerical aperture NA is represented as θ=sin−1 (NA), and when it comes to the total angle φ (see FIG. 6B) of the angle in the median intensity of B laser light emitted by the laser light source 211B, a ratio R with the total angle 2θ of the widening angle of the light defining the numerical aperture NA of the collimator optical system 72 (in the present embodiment, the collimator lenses 213) is represented by the equation below.

$$R=\sin^{-1}(NA)\times 2/\phi$$

In the present embodiment, because a large amount of stray light is emitted from the laser light source 211B, the numerical aperture of the lens NA is set such that NA and the total angle φ of the widening angle of the median intensity of laser beam satisfy the condition: $\phi \geq (\sin^{-1} NA) \times 2$.

In particular, the ratio R between the total angle φ of the widening angle in the median intensity of B laser light emitted from the laser light source 211B and the total angle 2θ of the widening angle of light defining the numerical aperture NA of the collimator optical system 72 is set to 2 or greater.

Figure 7:
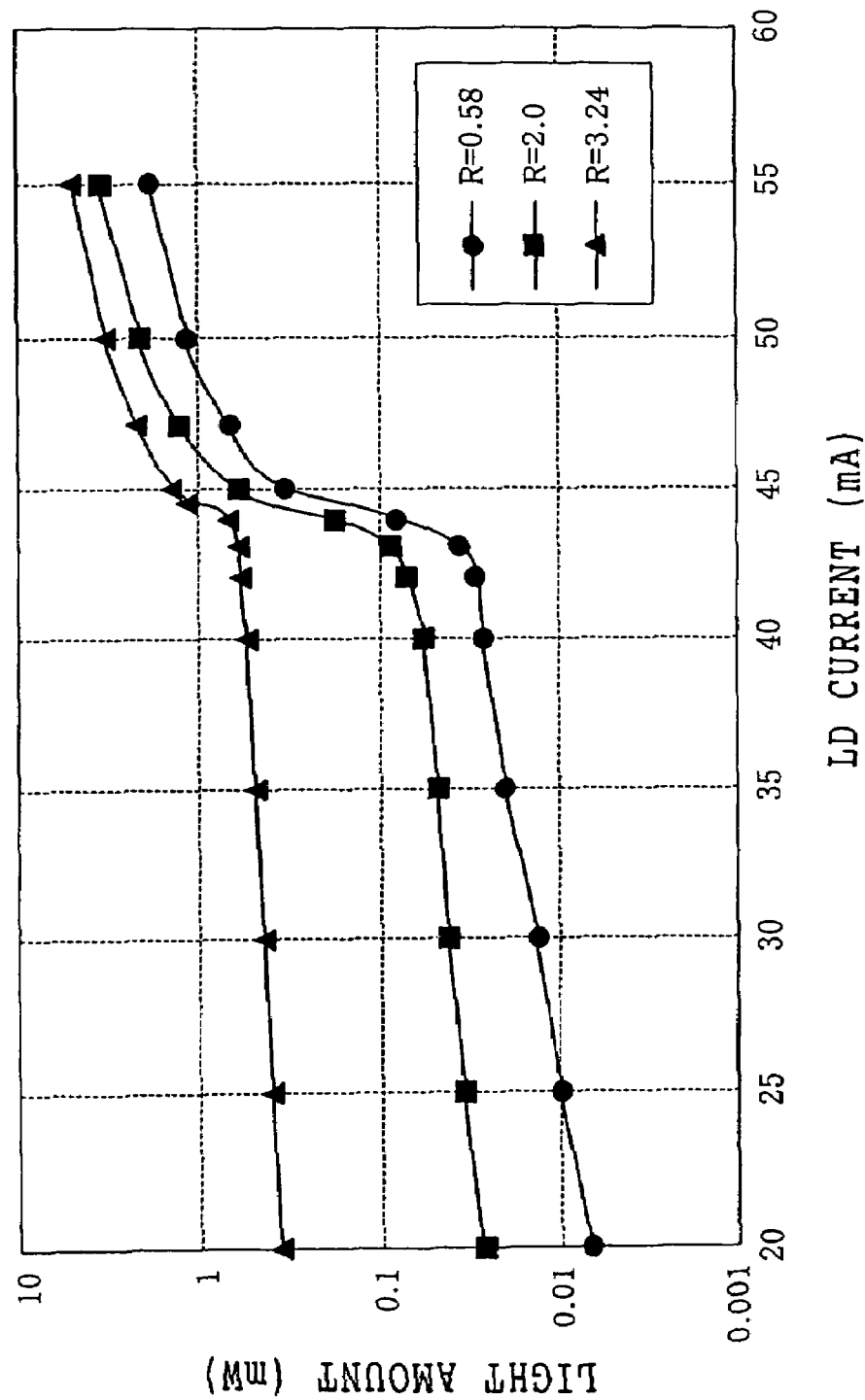
FIG. 7 is a graph showing a beam profile when a ratio R is varied.
Figure 8A:
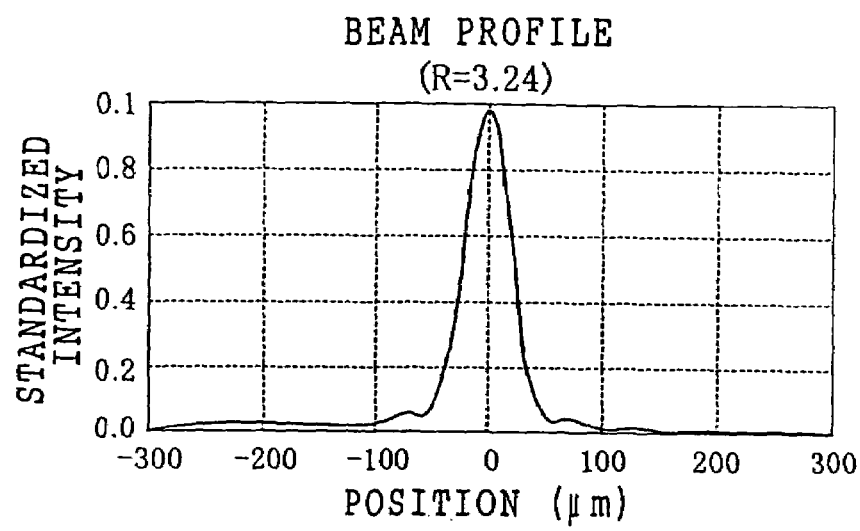
FIGS. 8A to 8C are graphs showing a beam profile when the ratio is varied.
Figure 8B:
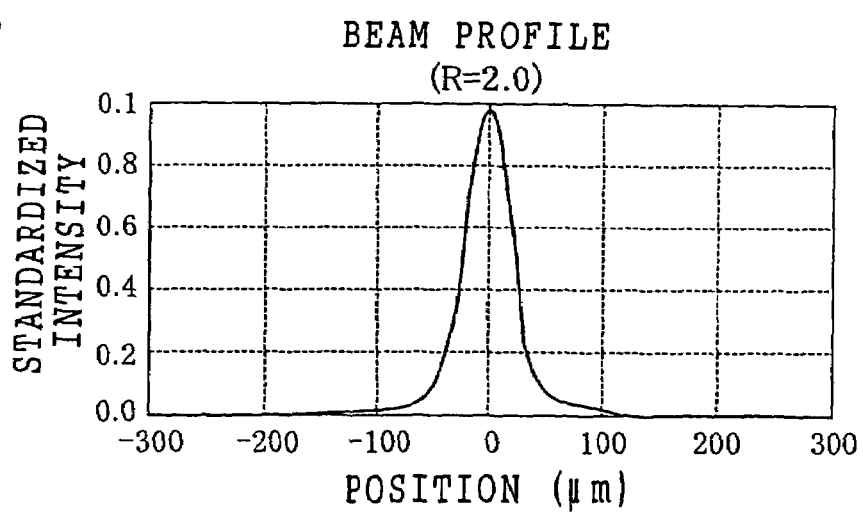

The ratio R is preferably set to 2.0≧R≧0.58. For example, in the present embodiment, the total angle φ of the widening angle in the median intensity of B laser light emitted from the laser light source 211B is 30 degrees, and measurement results of beam shapes and current/light amount characteristics when the collimator lenses 213 of numerical apertures NA 0.75, 0.5 and 0.15 were used are shown in FIGS. 7 and 8. In FIG. 7, current/light amount characteristics are shown when the ratio R is 3.24, 2.0 and 0.58 corresponding to when the numerical aperture is 0.75, 0.5, and 0.15. In FIG. 8, beam profiles are shown when the ratio R is 3.24, 2.0, and 0.58.

Figure 8C:
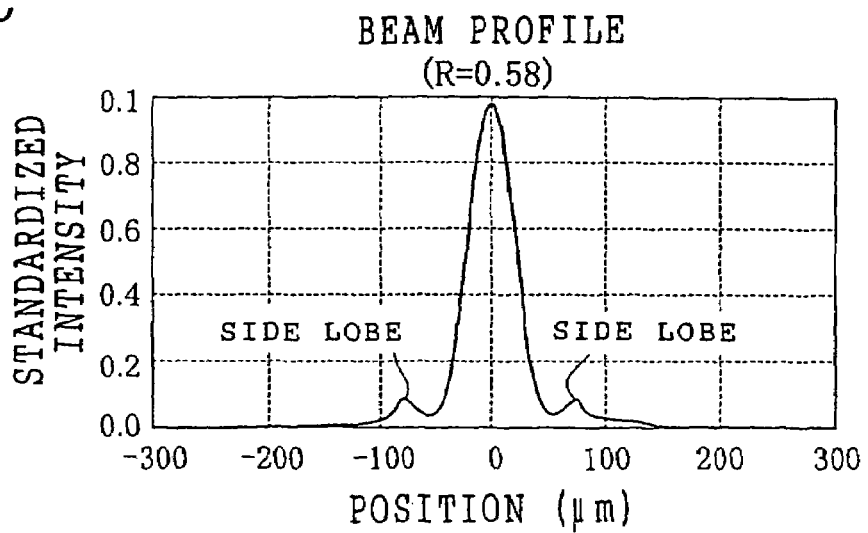

Generally, when exposing a silver halide photosensitive material in which the photosensitive material characteristic γ is 2.5 to 3.5, a modulation range of 2.01 logE or greater is necessary. As shown in FIG. 7, when the ratio R is made smaller, it is possible to obtain a modulation range of about 2.01 log E when R=2.0. When the ratio R is further made smaller, the modulation range expands but, as shown in FIG. 8C, side lobes appear at the beam profile and the sharpness of the exposed image drops because the ratio at which B laser light emitted from the laser light source 211B is kicked rises due to the collimator optical system 72.

Here, consideration will be given to a case in which exposure is conducted at a resolution of 300 dpi. The beam diameter defined when the light intensity in this case is 1/e2 is made the same as a pixel size 84.6 µm of 300 dpi, the ratio R of the exposure beam is altered, the amount of the side lobes is controlled, an exposure test is conducted, and the experiment results in which the impact on image quality was investigated are shown in FIG. 9.

In FIG. 9, results are shown in which the ratio R was altered to 2.0 to 0.30, a rectangular wave pattern was exposed, and changes in the density contrast thereof were investigated. A case in which exposure was conducted with a beam having no side lobes was taken as 100%, and the drop in density contrast is shown in numerical values. As a result of evaluating density contrast in terms of image quality, with respect to levels at which image quality degradation was visually recognizable as a significant difference, it was understood from the experiment that image quality degradation was remarkable contrast deterioration of less than 75%. When the lower limit of image quality degradation was 75% of contrast deterioration, 0.58 became the lower limit of the ratio R. That is, by setting the ratio R that can obtain a modulation range necessary for exposure to 2.0≧R≧0.58, it is possible to control image quality degradation without impacting side lobes.

(Control Unit)

Next, the control unit of the laser printer 18 including the drive circuit for driving the laser light source 211B comprising the GaN based semiconductor laser will be described in detail.

Figure 10:
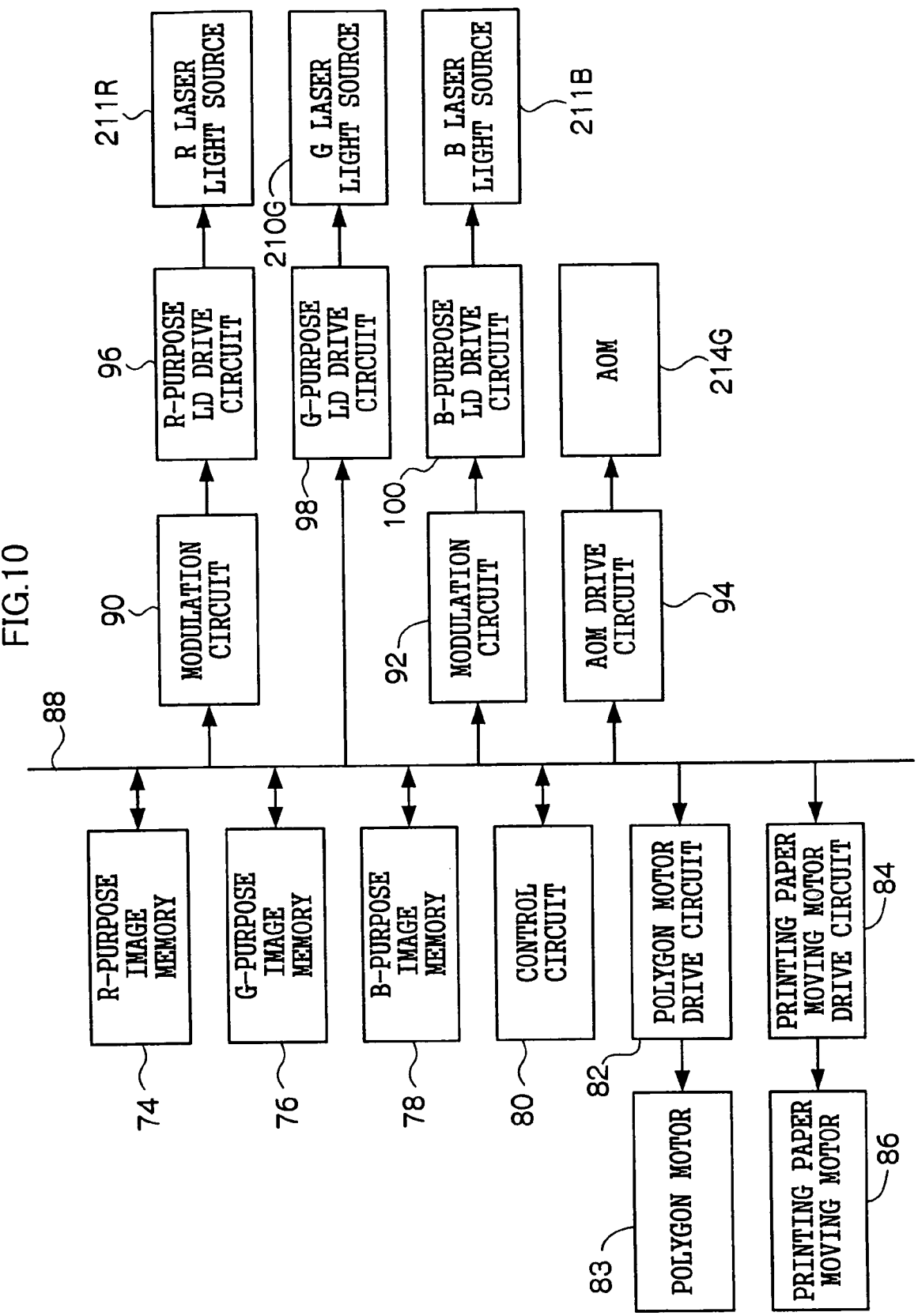
FIG. 10 is a block diagram showing a control unit in the laser printer.

As shown in FIG. 10, the control unit pertaining to the present embodiment is disposed with a control circuit 80 that includes a microcomputer. The control circuit 80 is connected to a bus 88, and an image data memories 74, 76 and 78 are connected to the bus 88. That is, the image data memories 74, 76 and 78 are disposed as memories for storing image data for recording images on the printing paper 224. The image data memory 74 is a memory that stores R-color image data, the image data memory 76 is a memory that stores G-color image data, and the image data memory 78 is a memory that stores B-color image data.

An R-purpose LD drive circuit 96, a G-purpose LD drive circuit 98, and a B-purpose LD drive circuit 100 are also connected to the bus 88. The R-purpose LD drive circuit 96 and the B-purpose LD drive circuit 100 are connected through modulation circuits 90 and 92, respectively. That is, the direct intensity of the semiconductor lasers 211R and 211B is modulated by modulation signals being generated by the modulation circuits 90 and 92 on the basis of image data and the modulation signals being superposed at the LD drive circuit.

An AOM drive circuit 94 is also connected to the bus 88, and drive of the AOM 94 is controlled. That is, the laser light source 2100 is indirectly modulated by the AOM 214G.

A polygon motor drive circuit 82 for driving a polygon motor 88 that rotatingly drives the polygon mirror 218 and a printing paper moving motor drive circuit 84 for driving a printing paper moving motor 86 for moving the printing paper 224 are also connected to the bus 88, and each is controlled by the drive circuit 80.

Next, operation of the laser printer 18 pertaining to the present embodiment will be described.

In a case where an image is recorded on the printing paper 224, in order to record by scan-exposure on the printing paper 224 an image represented by image data for recording inputted from the image processor 16, the control unit of the laser printer 18 carries out various corrections with respect to the image data for recording and creates image data for scan-exposure on the basis of parameters for image recording inputted from the image processor 16, and stores the created image data in the image data memories 74, 76 and 78.

Then, as the polygon mirror 218 of the laser printer 18 is rotated in the direction of arrow A in FIG. 3 and laser light of each color is emitted due to the laser light sources 211R, 210G, and 211B providing current to the semiconductor laser, modulation signals are generated on the basis of the created image data for scan-exposure, and the amplitude of the ultrasonic wave signal (high-frequency signal) provided to the AOM 214G in correspondence with levels of the modulation signals is altered to modulate the G laser light emitted from the AOM 214G as diffracted light. Accordingly, the G laser light, whose intensity has been modulated in correspondence to the density of the image to be recorded on the printing paper 224, is emitted from the AOM 214G The G laser light is irradiated on the printing paper 224 via the flat mirror 215, the spherical lens 216, the cylindrical lens 217, the polygon mirror 218, the f θ lens 220, the cylindrical lens 221, the cylindrical mirror 222, and the angled mirror 223.

With respect to the laser light sources 211R and 211B, laser light is modulated by modulating current intensity applied to the laser light sources 211R and 211B. Therefore, R laser light and B laser light that has been modulated in correspondence to the density of an image that is to be recorded on the printing paper 224 is emitted from the laser light sources 211R and 211B. These laser lights are irradiated on the printing paper 224 respectively through the collimator lenses 213, the cylindrical lens 217, the polygon mirror 218, the f θ lens 220, the cylindrical lens 221, the cylindrical mirror 222, and the angled mirror 223.

In accompaniment with the rotation of the polygon mirror 218 in the direction of arrow A in FIG. 3, main scanning is effected by the irradiated position of each laser light being scanned along the direction of arrow B in FIG. 3, sub-scanning of each laser light is effected by the printing paper 224 being conveyed at a constant speed along the direction of arrow C in FIG. 3, and an image (latent) is recorded on the printing paper 224 by scan-exposure.

Because the laser light source 211B pertaining to the present embodiment uses a GaN based semiconductor laser, a large amount of stray light is also emitted at the same time by the semiconductor laser, which adversely impacts the sharpness of the image to be recorded on the printing paper 224. However, in the present embodiment, as described above, the numerical aperture NA of the collimator lens 213 is controlled.

Figure 17A:
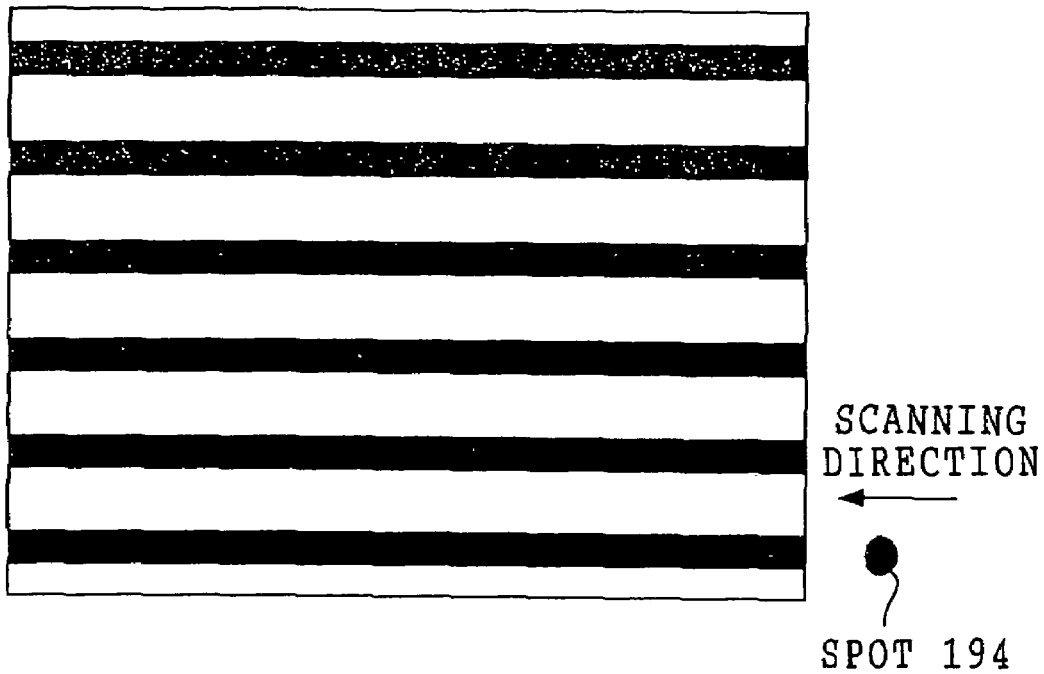
FIG. 17A is a diagram showing a striped pattern.
Figure 17B:
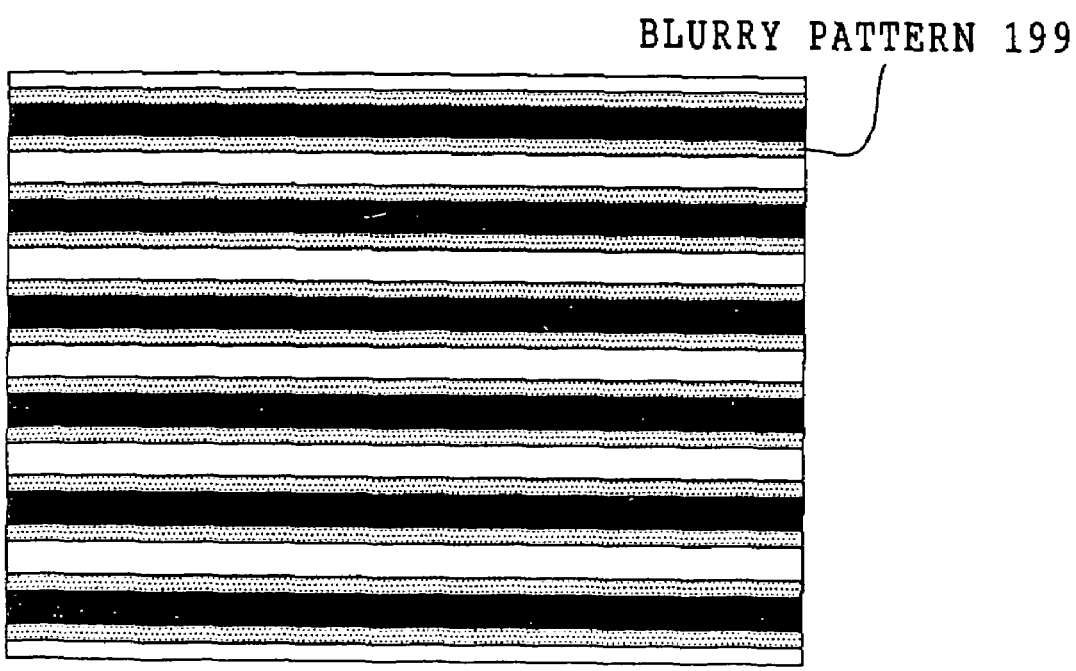
FIG. 17B is a diagram showing an example in which the blurry pattern has colored the striped pattern.

That is, stray light emitted from the GaN based semiconductor laser is kicked in correspondence to the numerical aperture NA of the collimator lenses 213, and the stray light is controlled by the numerical apertures of the collimator lenses 213. Therefore, when the image to be recorded on the printing paper 224 is a striped image such as the one shown in FIG. 17A, it is possible to control coloration between the stripes and to record an image of high sharpness.

It should be noted that, in the above-described scan-exposure, the timing at which modulation of each laser light is conducted and the timing at which the printing paper 224 is conveyed in the direction of arrow C in FIG. 3 is determined on the basis of the sensor output signal outputted from the SOS detection sensor 228.

The printing paper 224, on which an image has been recorded by scan-exposure, is sent to the processor 20, where various processing such as color development, bleach-fixing, rinsing and drying is conducted. Thus, an image is formed on the printing paper 224.

In this manner, in the laser printer 18 pertaining to the present embodiment, by setting the ratio R between the total angle φ of the widening angle in the median intensity of B laser light emitted from the laser light source 211B and the total angle 2θ of the widening angle of light defining the numerical aperture NA of the collimator optical system 72 (in the present embodiment, the collimator lenses 213) to be $2.0 \geq R \geq 0.58$, it is possible to control the stray light irradiated on the printing paper 224.

Further, by defining a lower limit of the ratio R to be 0.58, a modulation range necessary for exposure can be obtained without being influenced by the side lobes.

In the embodiment described above, the ratio R is set by the numerical aperture NA of the collimator lens 213, or by limitation of the numerical aperture NA by the opening 73 provided at the light incidence side of the collimator lens 213. However, the invention is not limited thereto, and the total angle φ of the widening angle in the median intensity of the B laser light emitted by the GaN based semiconductor laser may be set by selecting the GaN based semiconductor laser so that the ratio R satisfies $2.0 \geq R \geq 0.58$.

Figure 11:
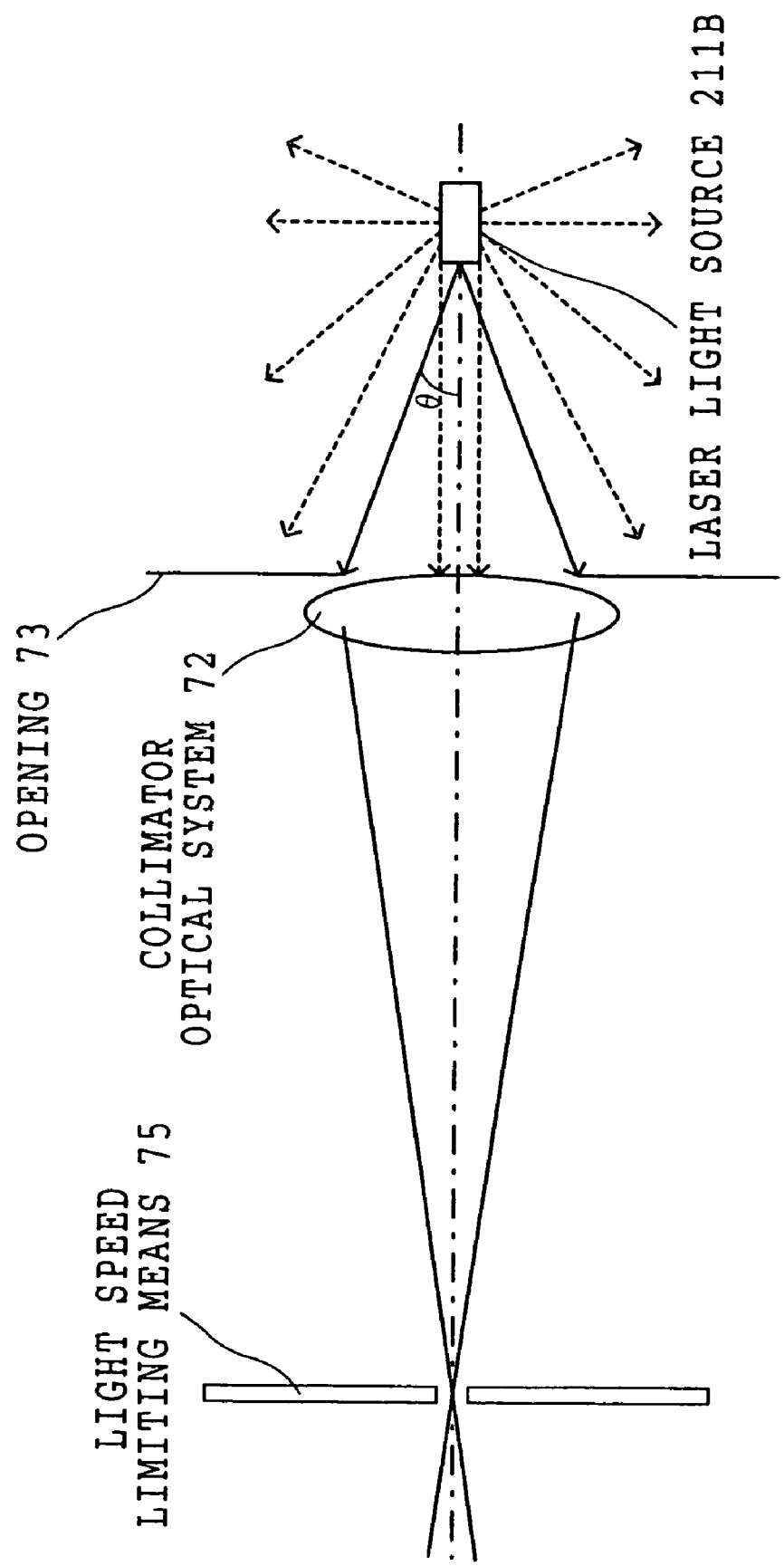
FIG. 11 is a view showing the optical system further disposed with a luminous flux limiter.
Figure 12:
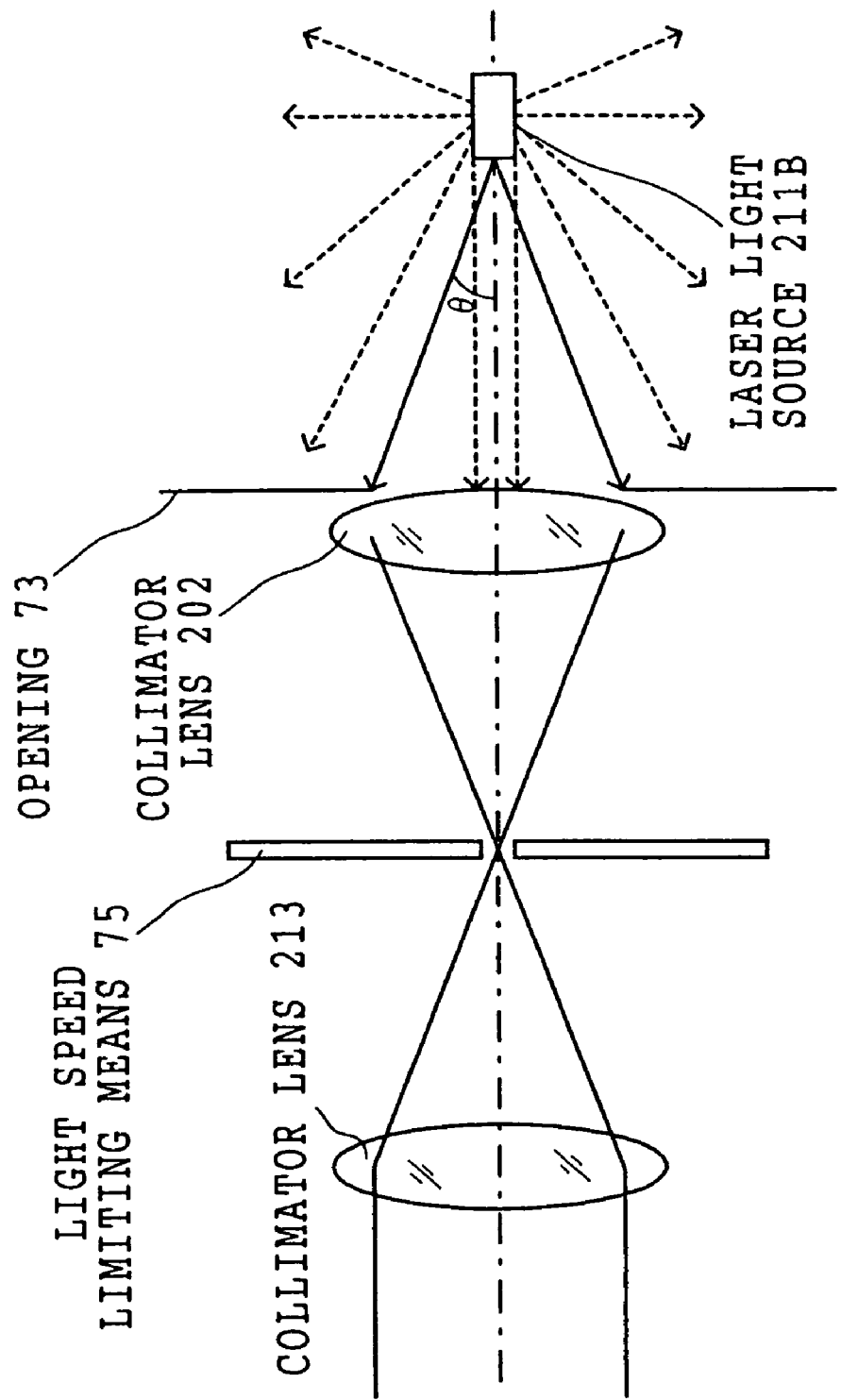
FIG. 12 is a view showing an example of the example system disposed with the luminous flux limiter.
Figure 13:
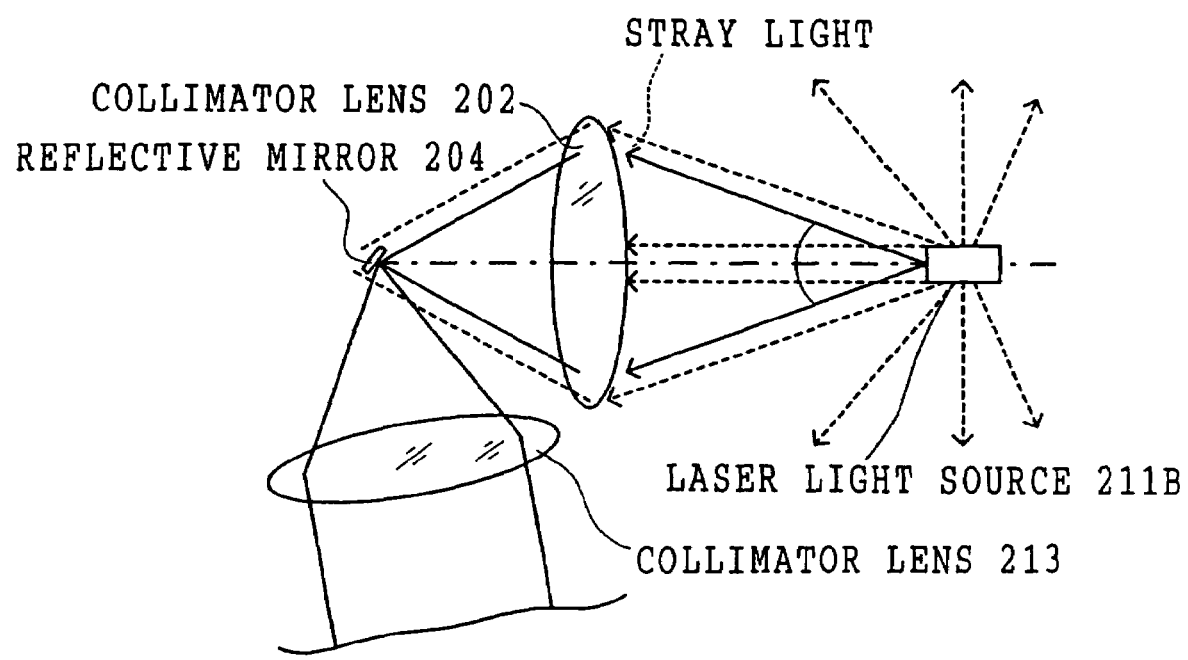
FIG. 13 is a view showing another example of the luminous flux limiter.

It should be noted that, in the above-described embodiment, stray light irradiated on the printing paper 224 is controlled by limiting the numerical aperture NA by the opening 73 disposed at the light incident side of the collimator lenses 213 or the numerical aperture of the collimator lenses 213. However, as shown in FIG. 11, a luminous flux limiter 75, such as a diaphragm resulting from a transmittance opening through which light is transmitted, may also be disposed at the position at which laser light of the collimator optical system 72 collimates. For example, as shown in FIG. 12, when a structure is present in which a collimator lens 202 and a collimator lens 213 are successively disposed within the collimator optical system 72, a luminous flux limiter 75 such as a transmittance opening (able to limit luminous flux by transmittance area) through which light is transmitted may be disposed at a position at which light is collimated by the collimator lens 202. By disposing the luminous flux controller 75 in this manner, it is possible to further control stray light irradiated on the printing paper 224. In addition to the transmittance opening shown in FIGS. 11 and 12, a reflective mirror (able to limit luminous flux by reflectance area) 204 also be used as the luminous flux controller 75, as shown in FIG. 13.

Figure 14:
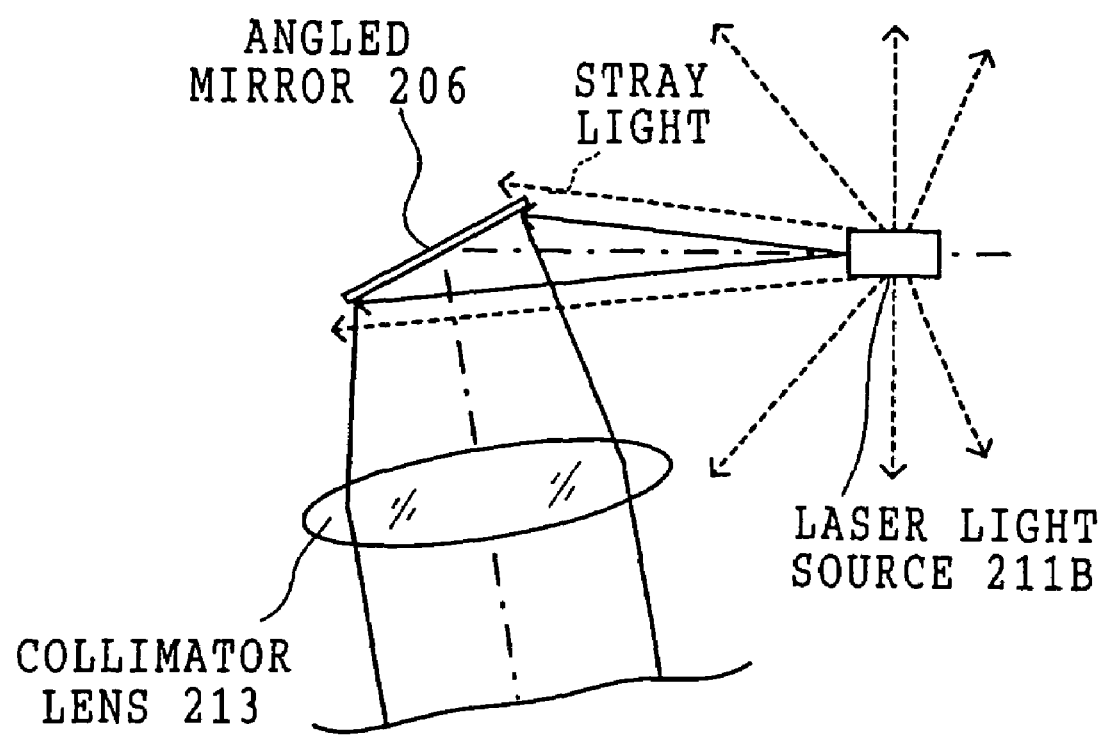
FIG. 14 is a view showing an example of a numerical aperture limiter using a folding mirror.
Figure 15:
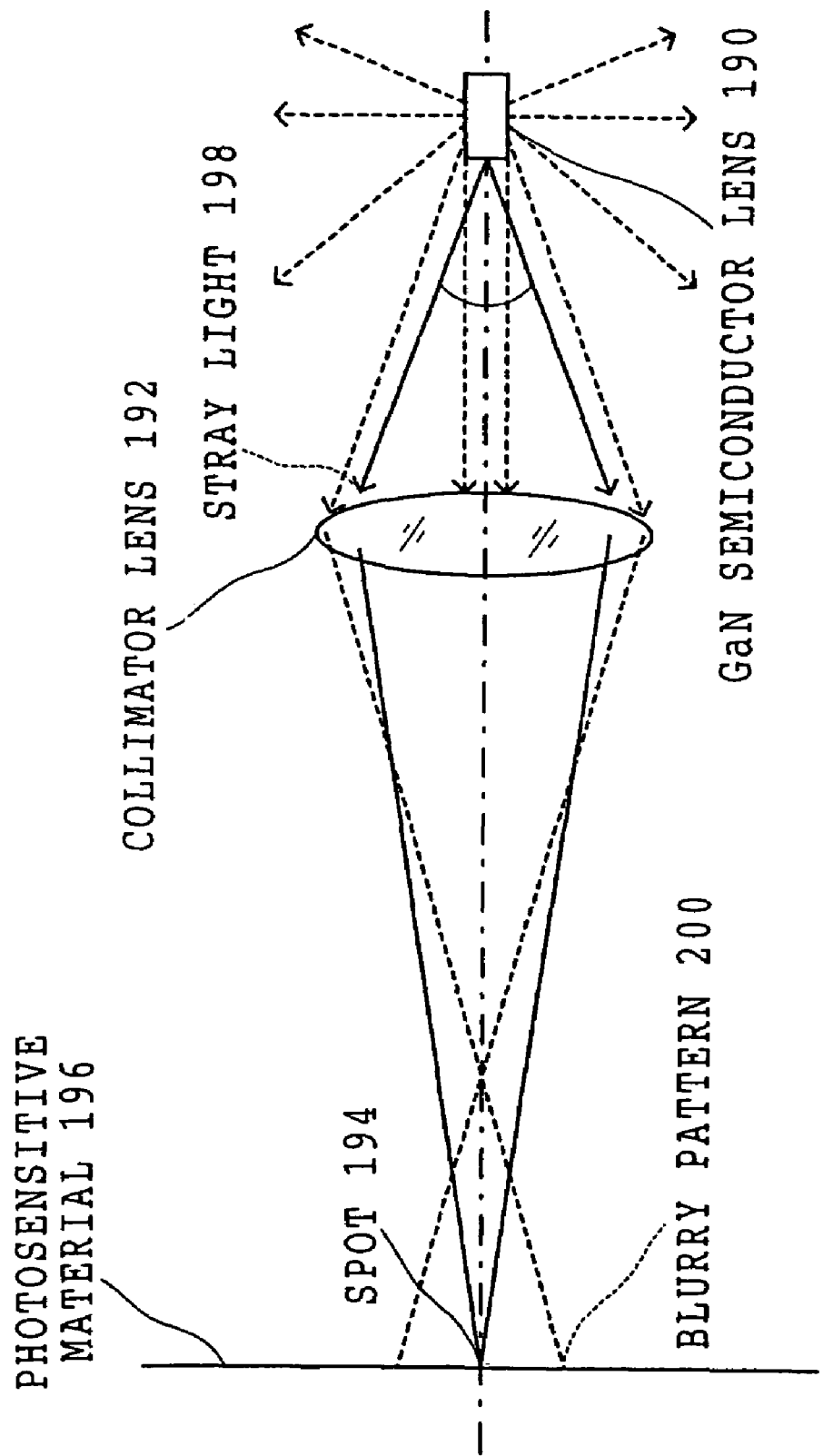
Figure 16:
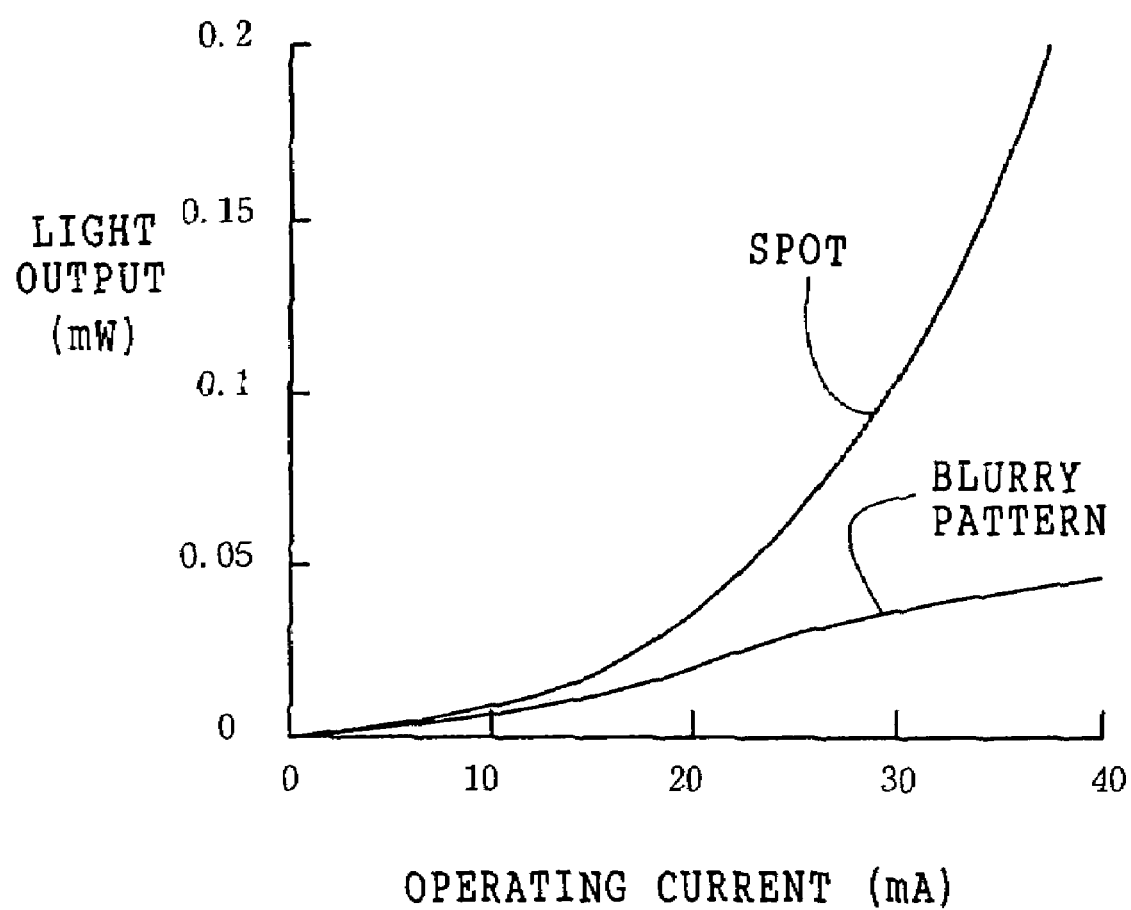
FIG. 16 is a graph showing the relation between light output of a spot and a drive current and the relation between light output of a blurry pattern and a drive current.

Moreover, in the present embodiment, when the numerical aperture NA of the collimator lens 213 is limited so that the ratio R becomes $2.0 \geq R \geq 0.58$, the numerical aperture NA of the collimator lens 213 is limited by the opening 73 disposed at the light incidence side of the collimator lens 213 or by the numerical aperture of the collimator lens 213 itself. However, the present invention is not limited to the same. For example, as shown in FIG. 14, it is also possible to dispose a numerical aperture limiter such as an angled mirror 206 at the laser light emission side of the laser light source 211B and limit the numerical aperture NA of the collimator lens 213 by the reflectance area of the reflective mirror 204.

Second Embodiment

Next, a second embodiment of the invention will be described. Description of structures that are the same as those described in the first embodiment will be omitted.

In the second embodiment of the invention, in contrast to the laser printer in the first embodiment, the collimator lens 213, the limiter 200, and the cylindrical lens 217 are successively disposed at the laser light emission side of the laser light source 211B. Laser light emitted from the laser light source 211B is collimated by the collimator lens 213, and an amount of light that is predetermined in correspondence to the amount of light emitted from the laser light source 211B is limited by the limiter 200. The laser light is irradiated at a position that is substantially the same as the above-described predetermined position on the reflective surface of the polygon mirror 218 and reflected by the polygon mirror 218.

It is possible to use a light filter (density filter or the like) or a half mirror as the limiter 200 to limit the light amount. Also, the limiter 200 does not have to be disposed between the collimator lens 213 and the cylindrical lens 217. An optical system disposed above the optical path of the laser light source 211B may be used as a limiter. For example, in order to increase reflectance of a mirror such as the polygon mirror 218, a reflective coat or the like may be coated. It is also possible to limit the light amount even by coating a coating surface on a lens in order to limit transmittance of a lens such as the collimator lens 213. Moreover, various kinds of limiters resulting from the optical system on the optical path of the laser light source 211B and various kinds of limiters such as light filters and half mirrors can be used in combination.

The action of the laser printer 18 in the second embodiment of the invention is different from that of the first embodiment in the following points.

With respect to the laser light source 211R, laser light is modulated by modulating the current intensity applied to the laser light source 211R. Therefore, R laser light that has been modulated in correspondence to the density of the image to be recorded on the printing paper 224 is emitted from the laser light source 211R. This R laser light is irradiated on the printing paper 224 through the collimator lens 213, the cylindrical lens 217, the polygon mirror 218, the f θ lens 220, the cylindrical lens 221, the cylindrical mirror 222, and the angled mirror 223.

With respect to the laser light source 211B, similar to the laser light source 211R, laser light is modulated by modulating the current intensity applied to the laser light source 211B. Therefore, B laser light that has been modulated in correspondence to the density of the image to be recorded on the printing paper 224 is emitted from the laser light source 211B. This B laser light is irradiated on the printing paper 224 through the collimator lens 213, the limiter 200, the cylindrical lens 217, the polygon mirror 218, the f θ lens 220, the cylindrical lens 221, the cylindrical mirror 222, and the angled mirror 223.

Figure 18:
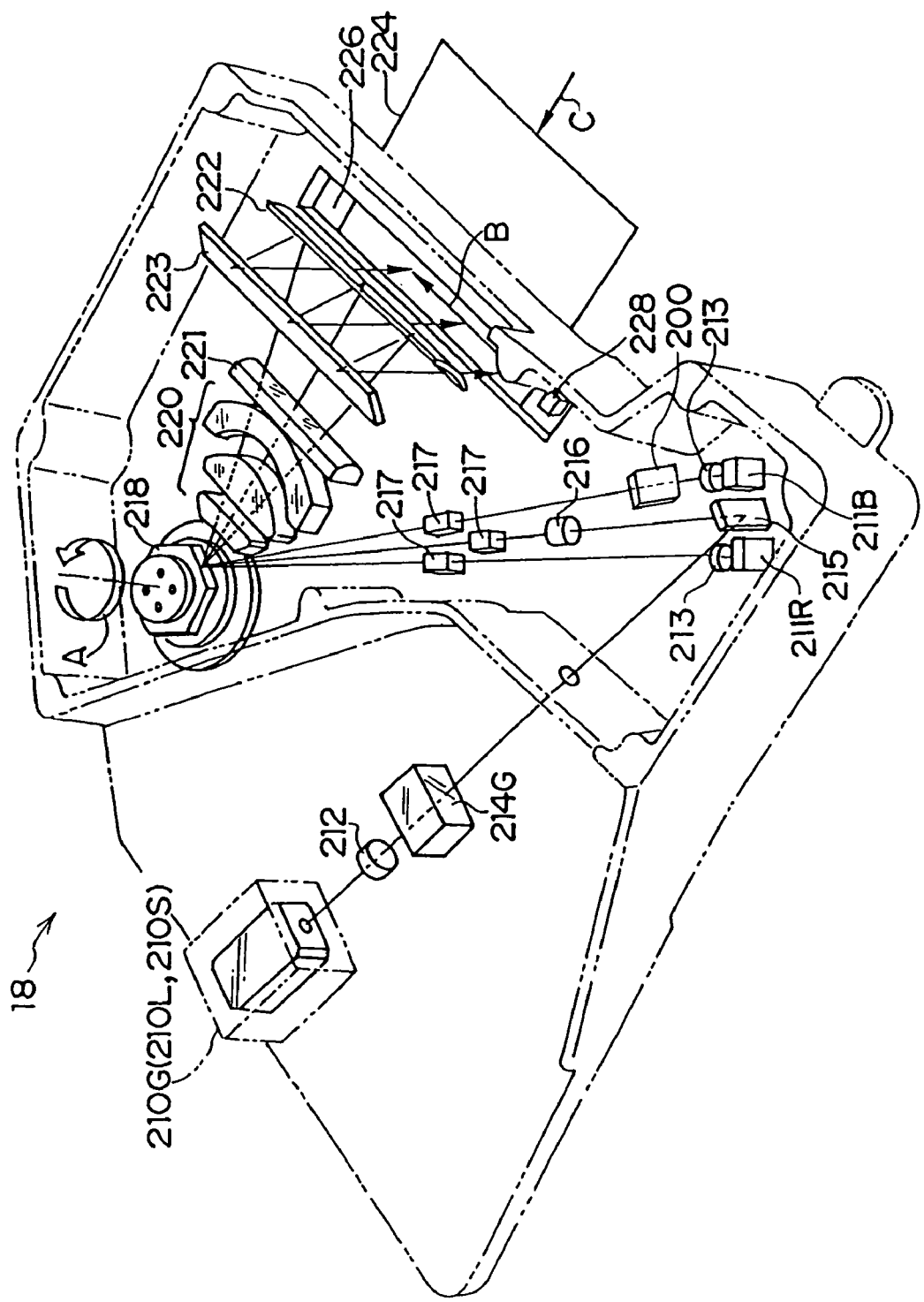
FIG. 18 is an oblique perspective view showing the schematic structure of a laser printer pertaining to a second embodiment of the invention.

In accompaniment with the rotation of the polygon mirror 218 in the direction of arrow A in FIG. 18, main scanning is effected by the irradiated position of each R, G and B laser light being scanned along the direction of arrow B in FIG. 18, sub-scanning of each laser light is effected by the printing paper 224 being conveyed at a constant speed along the direction of arrow C in FIG. 18, and an image (latent) is recorded on the printing paper 224 by scan-exposure.

Because the laser light source 211B uses a GaN based semiconductor laser, it has the characteristic of emitting a large amount of stray light, which adversely impacts image quality as described above.

The amount of light (InGaN based semiconductor laser (LD) or SLD laser) at the exposure surface near the 440 nm necessary to expose the color paper (the printing paper 224), which is a silver halide photosensitive material used in digital mini-laboratories, is in the relation shown in Table 1 below when exposure resolution (dpi) and laser scanning speed are used as parameters. It should be noted that a scanning speed of 500 to 1500 m/sec is for a mini-laboratory of standard capacity, a scanning speed lower than that is for a compact low-speed machine, and a scanning speed higher than that is for a large-scale mini-laboratory.

TABLE 1

| dpi | Scanning Speed (m/sec) | Exposure Surface Maximum Light Amount (μW) |
|---|---|---|
| 600 | 423 | 14.1 |
| 600 | 847 | 28.2 |
| 600 | 1411 | 47.0 |
| 400 | 635 | 31.8 |
| 400 | 1270 | 63.5 |
| 400 | 2117 | 105.8 |
| 300 | 847 | 56.4 |
| 300 | 1485 | 99.0 |
| 300 | 2822 | 188.1 |

As indicated in FIG. 1, it will be understood that the necessary exposure surface light amount in a standard mini-laboratory is 100 μW or less.

Figure 19:
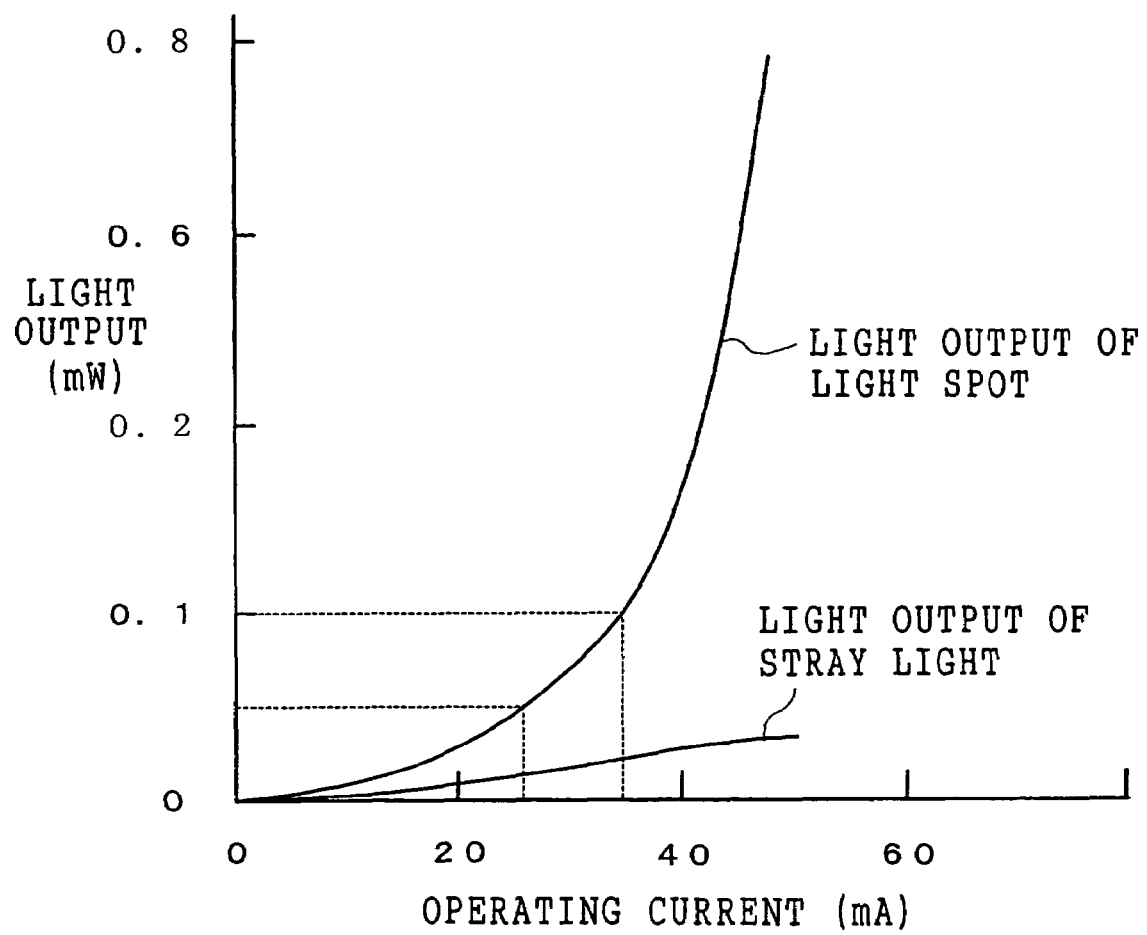
FIG. 19 is a graph for explaining reduction in a ratio between light output of stray light and light output of a light spot when the drive current is increased with regard to drive current characteristics/light output of a GaN based semiconductor laser.
Figure 20:
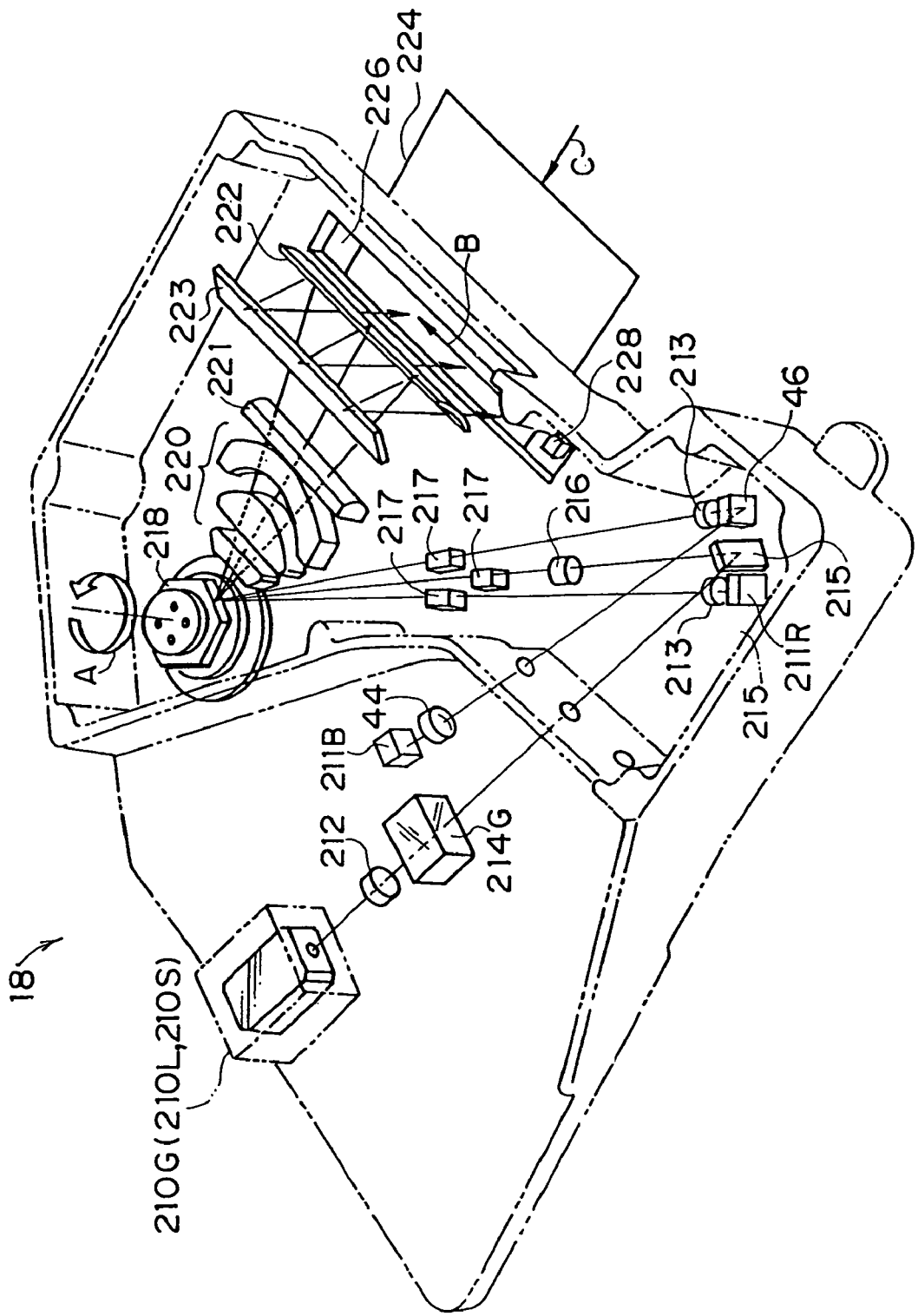
FIG. 20 is an oblique perspective view showing the schematic structure of a laser printer pertaining to a third embodiment of the invention.

As shown in FIG. 19, with respect to light output/drive current characteristics of a GaN based semiconductor laser, during times of low operating current, an extremely large light output of stray light is included in the ratio between light output of the collimator spot and light output of stray light. When the operating current is raised (e.g., 0.1 mW), the ratio of light output of stray light in the aforementioned ratio largely decreases in comparison to times of low operating current.

Thus, in the present embodiment, the drive current is increased and driven so that the light amount of B laser light outputted from the laser light source 211B becomes a light amount equal to or greater than that necessary to be able to expose the printing paper 224 even if B laser light is reduced, and the limiter 200 is disposed on the optical path of B laser light emitted from the laser light source 211B. That is, the laser light source 211B is made to emit light at a large light amount that exceeds the light amount for exposing an image on the printing paper 224, and the light amount of B laser light emitted from the laser light source 211B is limited to become a light amount necessary for exposure by the limiter 200 disposed on the optical path of B laser light emitted from the laser light source 211B, and the light is irradiated on the printing paper 224. That is, the ratio of stray light outputted from the laser light source 211B can be reduced as described above. Because the limiter 200 relatively limits the total light amount emitted from the laser light source 211B, B laser light in which there is little stray light can be irradiated on the printing paper 224.

When the laser light source 211B is driven to simply become a light output of 0.05 mW, the light output of stray light becomes about 15 μW. In contrast, in the present embodiment, when the laser light source 211B is driven to become a light output of 0.25 mW, the amount of light is limited by the limiter 200, and B laser light of 20% reaches the printing paper 224, the printing paper 224 is exposed at the light output of 0.05 mW, and a light output of about 30 μW of stray light in this case is limited to a light output of 6 μW by the limiter 200, whereby stray light is suppressed.

Therefore, stray light irradiated on the printing paper 224 can be suppressed by disposing the limiter 200 for limiting light amount on the optical path of B laser light emitted from the laser light source 211B and by driving the laser light source 211B at a drive current so that the light amount becomes a large light amount exceeding the light amount for exposing an image on the printing paper 224.

Moreover, as described above, because the necessary exposure surface light amount in a standard mini-laboratory is 100 µW or less, in the present embodiment, the drive current is driven so that light output of 0.5 mW or more is outputted from the laser light source 211B, and by making light loss due to the limiter 200 and the other optical system disposed on the optical path of B laser light, i.e., by making the light amount limited by the optical system 80% or more, it is possible to obtain an exposure surface light amount of 100 µW.

It should be noted that, in the above-described scan-exposure, the timing at which modulation of each laser light is conducted and the timing at which the printing paper 224 is conveyed in the direction of arrow C in FIG. 18 is determined on the basis of the sensor output signal outputted from the SOS detection sensor 228.

The printing paper 224, on which an image has been recorded by scan-exposure, is sent to the processor 20, where various processing such as color development, bleach-fixing, rinsing and drying is conducted. Thus, an image is formed on the printing paper 224.

Third Embodiment

Next, a third embodiment of the invention will be described. Description of structures that are the same as those described in the first and second embodiments will be omitted.

The laser printer in the third embodiment of the invention includes the following characteristics that are different from those of the first and second embodiments.

The collimator lens 213 and the cylindrical lens 217 are successively disposed at the laser light emission side of the laser light source 211R. Laser light emitted from the laser light source 211R is collimated by the collimator lens 213 and irradiated via cylindrical lens 217 at a position that is substantially the same as the above-described predetermined position on the reflective surface of the polygon mirror 218 and reflected by the polygon mirror 218.

The collimator lens 212 and the acoustooptic modulator (AOM) 214G that serves as an outside modulator are successively disposed at the laser light emission side of the laser light source 210G The AOM 214G is disposed so that laser light made incident thereon passes through an acoustooptic medium, and is connected to an AOM driver (not illustrated). When a high-frequency signal is inputted from the AOM driver, an ultrasonic wave corresponding to the high-frequency signal is propagated through the acoustooptic medium, diffraction occurs due to an acoustooptic effect acting on the laser light passing through the acoustooptic medium, and laser light of a strength corresponding to the amplitude of the high-frequency signal is emitted from the AOM 214G as diffracted light. In short, the AOM is a light modulator that uses an acoustic diffraction phenomenon in which the refractive index of material is altered by sound waves and an optical diffraction grating is created.

Figure 21:
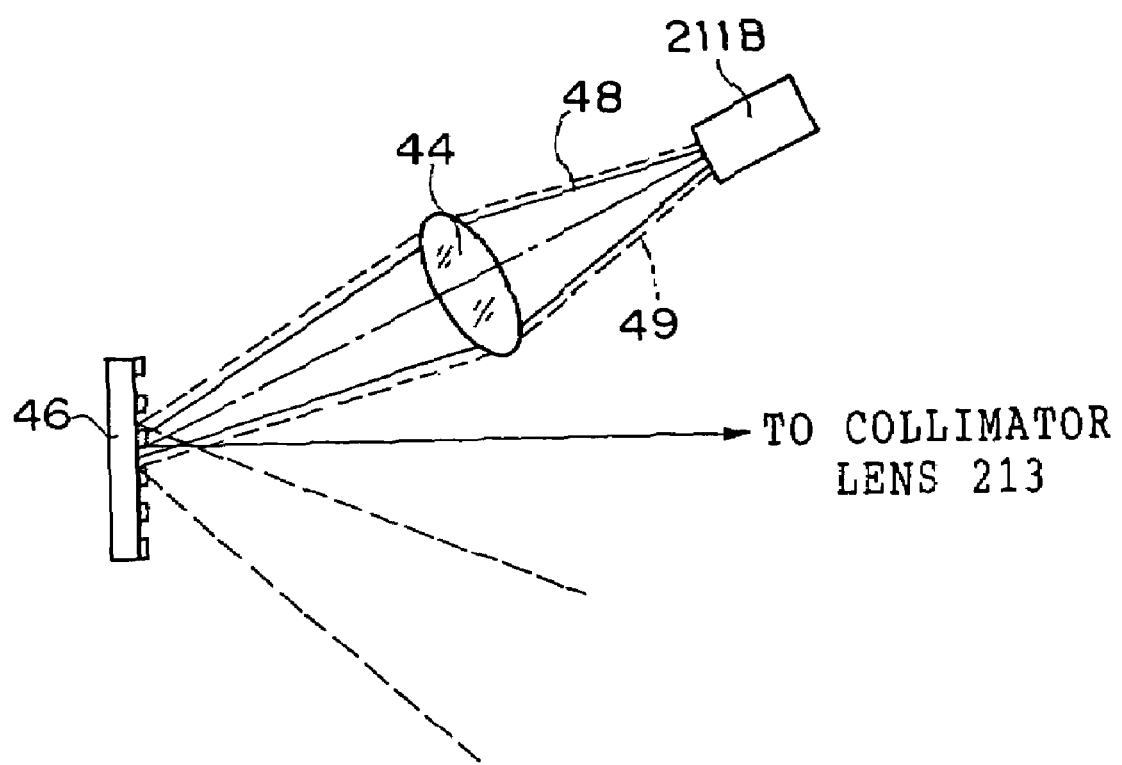
FIG. 21 is a schematic diagram showing a principle in which EL light is separated from output light of a B-color laser light source in the laser printer shown in FIG. 20.

A collimator lens 44 and a reflective diffraction grating 46 that serves as a diffraction unit are successively disposed at the laser light emission side of the laser light source 211B. The reflective diffraction grating 46 diffracts laser light in a predetermined direction using an interference effect and reflects stray light other than laser light in a direction different from the direction in which the laser light is diffracted. Light emitted from the laser light source 211B is collimated by the collimator lens 44 and reflected on a surface of the reflective diffraction grating 46. As shown in FIG. 21, laser light 48 laser-oscillated at a predetermined wavelength and EL light 49 are emitted from the laser light source 211B. The laser light 48 is indicated by the solid lines and the EL light 49 is indicated by the dotted lines. Whereas the emission angle of the laser light 48 is within a predetermined range and the laser light 48 is light in which the wave front and wave length are uniform, the EL light 49 is incoherent light in which the emission position, direction, and wave length are random. For this reason, when the laser light 48 and the EL light 49 are irradiated on the surface of the reflective diffraction grating, the laser light 48 oscillated at a predetermined wavelength is diffracted in a predetermined direction at the reflective diffraction grating 46, but the EL light 49 is reflected as it is virtually without being diffracted. Thus, it is possible to separate and remove the EL light included in the output light of the laser light source 211B.

The collimator lens 213, the cylindrical lens 217, and the polygon mirror 218 are successively disposed at the diffracted light emission side of the reflective diffraction grating 46. B laser light emitted as diffracted light from the reflective diffraction grating 46 is collimated by the collimator lens 213 and irradiated via the cylindrical lens 217 at a position that is substantially the same as the above-described predetermined position on the reflective surface of the polygon mirror 218 and reflected by the polygon mirror 218.

(Detailed Structure of the 440 nm Oscillation Wavelength Semiconductor Laser)

Next, an example of the structure of the 440 nm oscillation wavelength GaN LD used in the laser light source 211B in the third embodiment of the invention will be described in detail. A laminate structure of the GaN LD is shown in FIG. 22.

Figure 22:
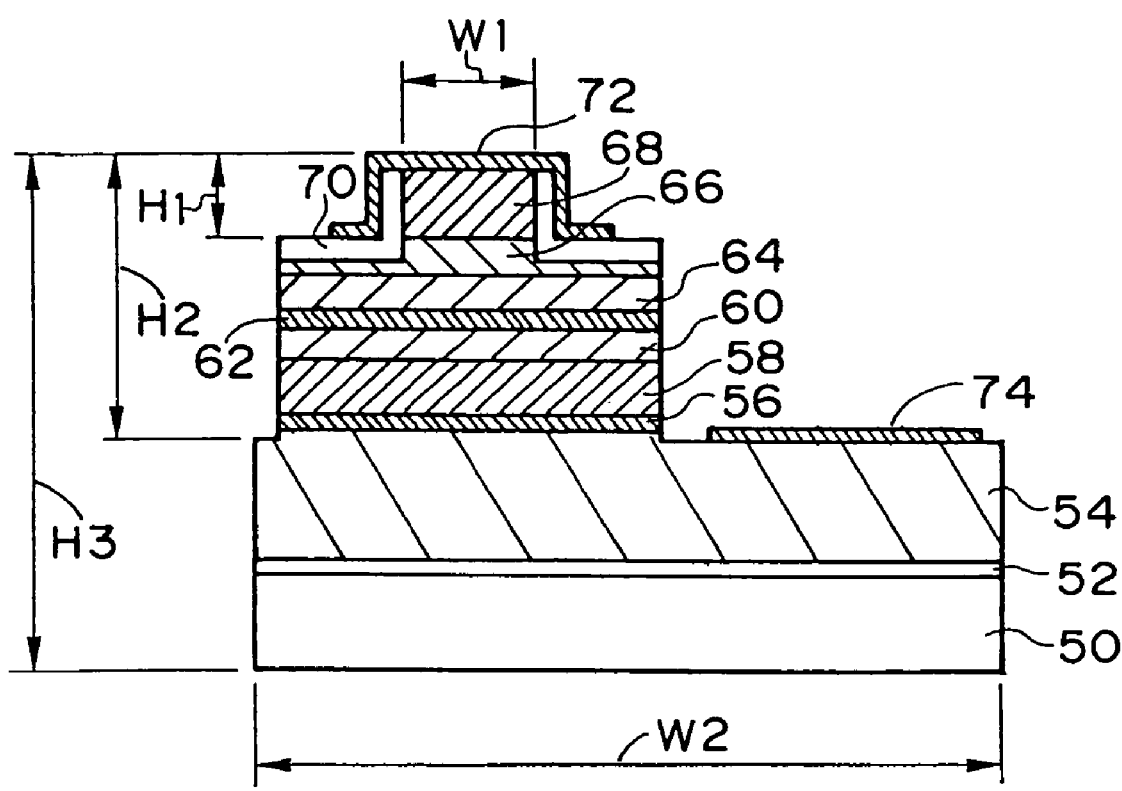
FIG. 22 is a cross sectional diagram showing a layered structure of the GaN based semiconductor laser.

In the GaN LD shown in FIG. 22, a low-defect n-GaN substrate layer 52, and n-GaN buffer layer 54 (silicon (Si)-doped, thickness of 5 µm), an n-In 0.1 Ga 0.9 N buffer layer 56 (silicon (Si)-doped, thickness of 0.1 µm), an n-A 10.1 Ga 0.9 N cladding layer 58 (silicon (Si)-doped, thickness of 0.45 µm), an n-GaN guide layer 60 (silicon (Si)-doped, thickness of 0.08 µm), an undoped active layer 62, a p-GaN guide layer 64 (magnesium (Mg)-doped, thickness of 0.08 µm), a p-A 10.1 Ga 0.9 N cladding layer 66 (Mg-doped, thickness of 0.45 µm), and a p-GaN capping layer 68 (Mg-doped, thickness of 0.25 µm) are successively laminated on a sapphire substrate 50.

The active layer 60 is a double quantum well structure in which undoped In 0.05 Ga 0.95 N (thickness of 10 nm), undoped In 0.23 Ga 0.77 N quantum well layer (thickness of 3 nm), undoped In 0.05 Ga 0.95 (thickness of 5 nm), undoped In 0.23 Ga 0.77 N quantum well layer (thickness of 3 nm), undoped In 0.05 Ga 0.9 N (thickness of 10 nm), and undoped A 10.1 Ga 0.9 N (thickness of 10 nm) are laminated in this order.

This laminate has a height (H3) of about 100 µm, a width (W2) of about 300 µm, and is ablated to a depth at which the n-GaN buffer layer 54 is exposed, whereby a post-shaped mesa is formed. The height (H2) of the mesa is 3 to 5 µm. The mesa is ablated to a depth at which the p-A 10.1 G 0.9 N cladding layer 66 is exposed, whereby a ridge stripe is formed. The height (H1) of the ridge portion is about 0.9 µm, and the width (W1) of the ridge portion is about 1.7 µm.

An upper surface of the exposed p-A 10.1 G 0.9 N cladding layer 66 and side surfaces of the p-GaN capping layer 68 are covered by a silicon nitride (SiN) film 70. A p-side electrode 72 is formed on the p-GaN capping layer 68 so as to contact the exposed portion of the p-GaN capping layer 68, and an n-side electrode 74 is formed on the exposed n-GaN buffer layer 54. In this LD, when the current flows from the p-side electrode 72 to the n-side electrode 74, a current path is sandwiched by the ridge stripes and effectively injected into the active layer 62, whereby 440 nm oscillation wavelength laser light is removed from the edges.

Next, the manufacturing process of the LD of the above-described structure will be simply explained. First, a low-defect n-GaN substrate layer 52 is formed on a c surface of a sapphire substrate 50 by a method disclosed in the literature (S. Nagahama, et. al., Jpn. J. Appl. Phys. Vol. 39, No. 7A, p. L647 (2000)).

Next, using metal organic chemical vapor deposition (MOCVD), an n-GaN buffer layer 54, an n-In 0.1 Ga 0.9 N buffer layer 56, an n-A 10.1 Ga 0.9 N cladding layer 58, an n-GaN guide layer 60, an undoped active layer 62, a p-GaN guide layer 64, a p-A 10.1 Ga 0.9 N cladding layer 66, and a p-GaN capping layer 68 are successively laminated.

Next, the substrate is removed from the growth chamber and part of the laminate is removed by reactive ion beam etching (RIBE) using chlorine ions until the p-A 10.1 Ga 0.9 N cladding layer 66 is exposed, whereby ridge stripes having a width of about 1.7 μm are formed. The p-A 10.1 Ga 0.9 N cladding layer 66 is removed to a depth of 0.1 μm from the surface of the p-GaN guide layer 64.

Next, the surface of the exposed p-A 10.1 Ga 0.9 N cladding layer 66 and the surface of the p-GaN capping layer 68 are covered with an SiN film 70 by plasma CVD, a resist mask is formed by photolithography, and the SiN film formed on the ridge is selectively removed by etching. Thereafter, p-type impurities are activated by heating in a nitrogen gas atmosphere.

Next, the epilayer other than portions including light emission regions (portions unnecessary for structuring the laser) is removed by RIBE using chlorine ions until the n-GaN buffer layer 54 is exposed, whereby a post-shaped mesa is formed.

Next, Ni/Au is successively vacuum-evaporated on the exposed surface of the p-GaN capping layer 68 and Ti/Al/Ti/Au is successively vacuum-evaporated on the exposed surface of the n-GaN buffer layer 54, and each are annealed in a nitrogen atmosphere to form ohmic electrodes. Thus, the p-side electrode 72 is formed on the p-GaN capping layer 68, and the n-side electrode 74 is formed on the n-GaN buffer layer 54. Finally, resonator ends are formed by cleavage. Thus, the LD is completed.

It should be noted that it is also possible to use a sapphire substrate of an insulator or a conductive silicon carbide (SiC) substrate in place of the sapphire substrate on which the low-defect n-GaN substrate layer 52 is formed. Moreover, it is also possible to reduce translocation of oscillation stripe regions, as disclosed in the literature (Matsushita, *Optronics,* No. 1, p. 62 (2000)), by forming each layer of the laminate using epitaxially lateral over growth (ELOG) rather than MOCVD.

Figure 23:
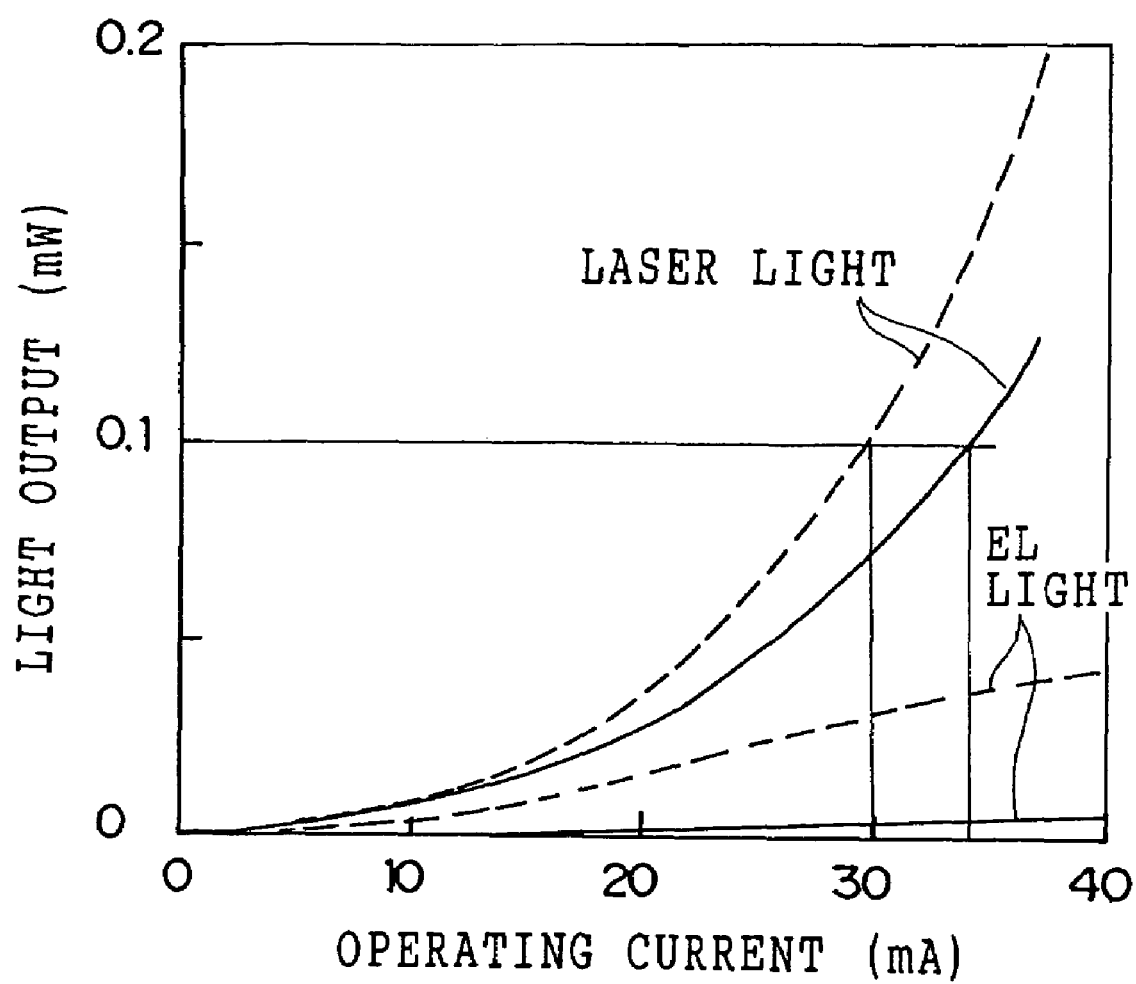
FIG. 23 is a graph showing the relation between a drive current and light strength on a printing paper due to output light from the B-color laser light source.

The relation between the drive current and light intensity (light output) on the printing paper resulting from light emitted from the laser light source 211B which is the B laser light source, is shown in FIG. 23. As indicated by the solid line, in the present embodiment in which the reflective diffraction grating is used, light intensity at the printing paper resulting from EL light is largely reduced. Exposure of the printing paper is sufficient at a power of about 0.1 mW, but light intensity on the printing paper resulting from the EL light is extremely low even in low exposure intensity regions in which the light intensity on the printing paper in the laser spot becomes about 0.1 mW. The relation between the drive current and light intensity on the printing paper when light emitted from the laser light source 211B is made incident directly on the collimator lens 214 without using the reflective diffraction grating is indicated by the dotted lines. Even compared with this, it will be understood that, in the present embodiment, light intensity on the printing paper resulting from the EL light was largely reduced by about 1/10.

As described above, in the present embodiment, the GaN LD was used in the B laser light source (laser light source 211B). Because EL light included in the output light of the GaN LD can be largely reduced using the reflective diffraction grating, a pattern in which the contour thereof is unclear on the printing paper due to the EL light is not formed. For this reason, it is possible to expose the printing paper at a laser spot whose contour is sharp, and it possible to obtain a high-resolution image having excellent sharpness.

It is possible for the optical system of the laser printer to be simplified by directly modulating the GaN LD and miniaturize the entire device. It is also possible to dispose an external modulator such as an electro optic modulator (EOM) or an AOM at the diffracted light emission side of the reflective diffraction grating and externally modulate the GaN LD instead of direct modulation.

Fourth Embodiment

Next, a fourth embodiment of the invention will be described.

The digital laboratory system pertaining to the fourth embodiment is the same as the digital laboratory system pertaining to the third embodiment, except that in the optical system of the laser printer, the B-color laser light source is not directly modulated, but laser light is modulated by a grating light valve (GLV) of a reflective diffraction grating type disposed with a light modulating function as a diffraction unit. Therefore, description of the same parts will be omitted, and description will be given only of the different points.

Figure 24:
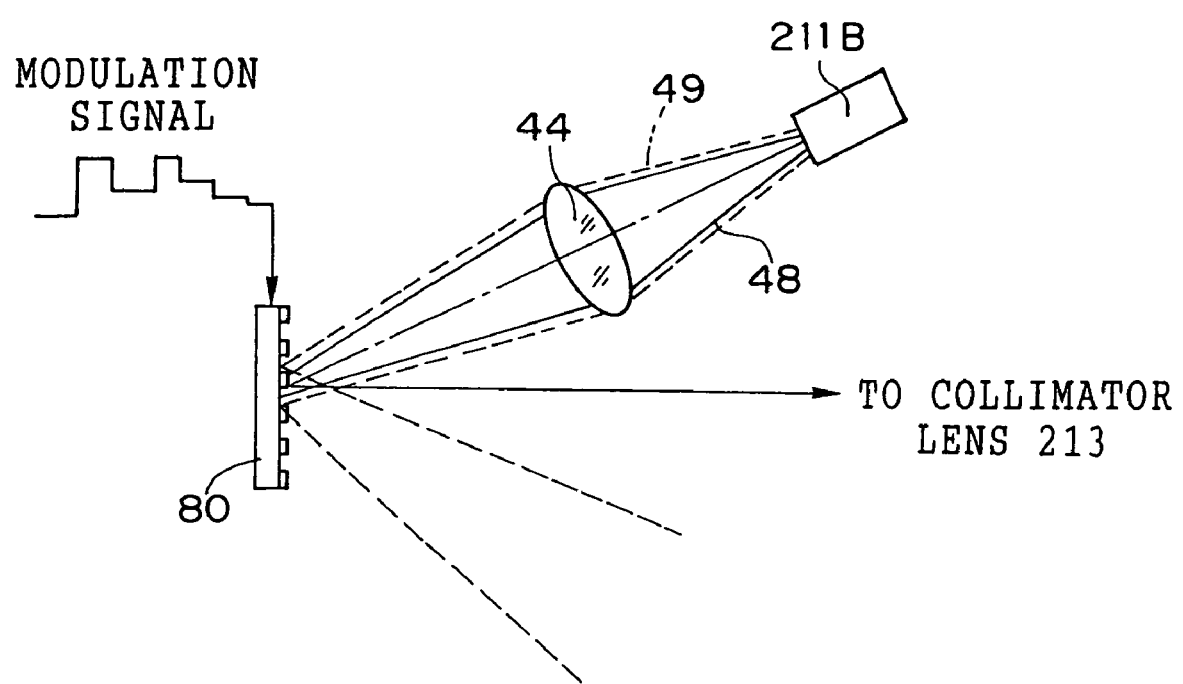
FIG. 24 is a schematic diagram showing a structure for separating EL light from output light of a B-color laser light source in a laser printer of a digital laboratory system pertaining to a fourth embodiment of the invention.

As shown in FIG. 24, the collimator lens 44 and a GLV 80 are successively disposed at the laser light emission side of the laser light source 211B comprising the GaN LD. The GLV 80 is predisposed at a predetermined angle (e.g., 90°) with respect to the optical axis of the collimator lens 213, so that light diffracted at the GLV is made incident on the collimator lens 213 disposed at the emission side.

Light emitted from the laser light source 211B is collimated by the collimator lens 44 and irradiated on a surface of the GLV 80. When the laser light 48 and the EL light 49 are irradiated on the surface of the GLV 80, the laser light 48 that has been oscillated at a predetermined wavelength is modulated at the GLV 80 in correspondence to an input signal as described later and diffracted in a predetermined direction, and the EL light 49 is reflected as it is without hardly being diffracted and without relation to the input signal. Thus, it is possible to separate and remove the EL light included in the output light of the laser light source 211B.

Figure 25A:
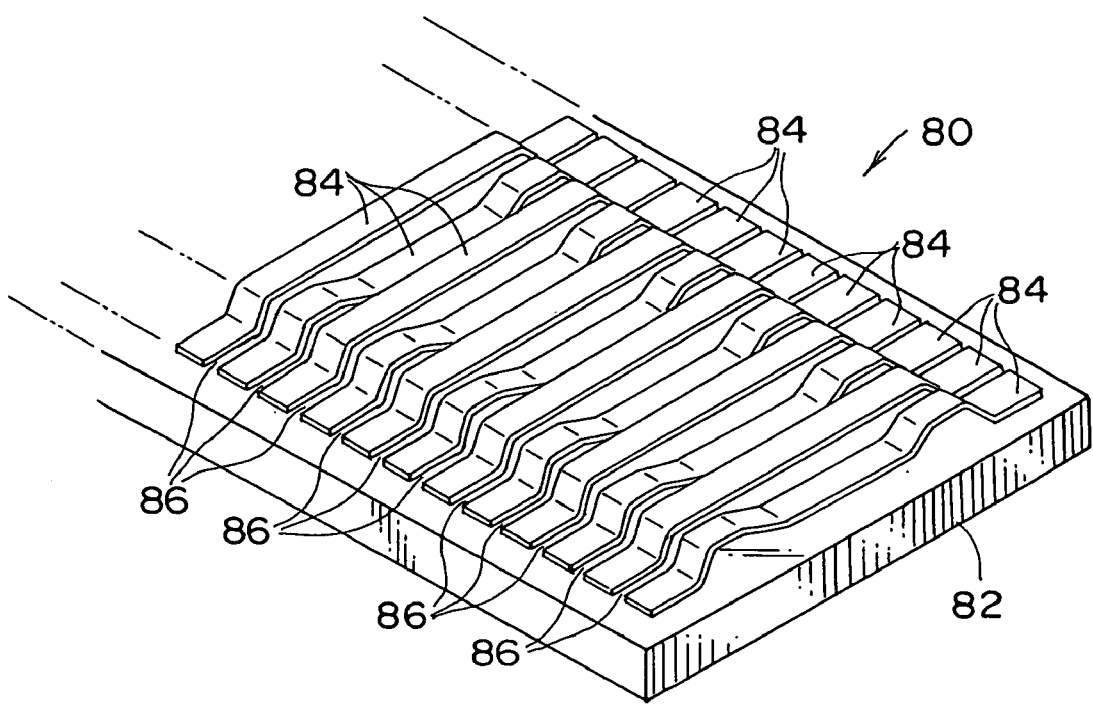
FIG. 25A is an oblique perspective view showing the schematic structure of a grating light valve (GLV)
Figure 25B:
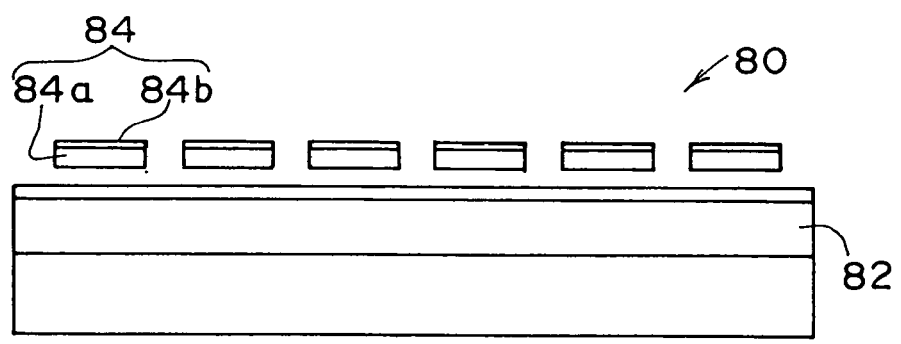
FIG. 25B is a view for explaining the operational principle of the GLV.
Figure 25C:
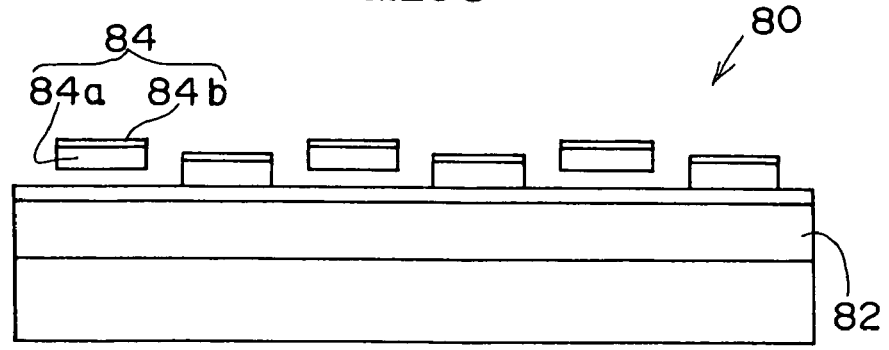
FIG. 25C is a view for explaining the operational principle of the GLV.

Referring to FIGS. 25A to 25C, description will be given here of the structure and operating principle of the GLV 80. The GLV 80 is a spatial light modulator (SLM) of the micro electro mechanical systems (MEMS) type as disclosed in, for example, U.S. Pat. No. 5,311,360. As shown in FIG.

25A, plural gratings are sequentially disposed in one direction. Plural (e.g., six) ribbon-like micro bridges 84 that serve as movable gratings are disposed on a substrate 82 of the GLV 80 comprising silicon or the like. Plural slits 86 are formed by arranging the micro bridges 84 in parallel. The micro bridges 84 are spaced a predetermined distance from the substrate 82. As shown in FIGS. 25B and 25C, the undersurface of each micro bridge 84 facing the substrate 82 comprises a flexible beam 84a formed of silicon nitride (SiNx) or the like, and the upper surface of each micro bridge 84 comprises a reflective electrode film 84b formed of single layer of metallic film such as aluminium (or gold, silver, copper, etc.).

The GLV 80 is drivingly controlled by turning on and off a voltage applied between the micro bridges 84 and the substrate 82. When the voltage applied between the micro bridges 84 and the substrate 82 is turned on, electrostatic attraction is generated between the micro bridges 84 and the substrate 82 by an electrostatic induced charge, whereby the micro bridges 84 bend towards the substrate 82. When the applied voltage is turned off, the micro bridges 84 stop bending and separate from the substrate 62 by elastic return. Therefore, by alternatingly disposing the micro bridges 84 to which the voltage is applied, it is possible to create a diffraction grating by the application of the voltage.

When the voltage is not applied to the micro bridges 84 (when the GLV is not driven), the height of the reflective surface of the micro bridges 84 is all uniform, and reflected light is regularly reflected without any optical path difference. When the voltage is applied to one micro bridge 84 (when the GLV is driven), the center of the micro bridge 84 bends according to the above-described principle, and the reflective surface becomes one in which there are alternating differences in height. When laser light is made incident on this reflective surface, optical path difference arises in light reflected at the micro bridges 84 that are not bent, and a light diffraction phenomenon occurs. Intensity $I_{1st}$ of first order diffracted light is dependent on the generated optical path difference and can be represented by the following equation. In this case, intensity of the diffracted light becomes the greatest when $\lambda/2$ as the optical path difference.

$$I_{1st}=I_{MAX}\sin(2\pi/\lambda) \qquad \text{(Equation 1)}$$

The GLV 80 is connected to a GLV driver (not illustrated), and when pulse modulation signal is inputted from the GLV driver, the GLV 80 is turned on or off in correspondence to the input signal. That is, when the signal is off, the GLV is not driven, and light made incident on the GLV 80 is reflected at a reflectance angle that is the same as the incidence angle and becomes 0 order reflected light. This 0 order reflected light is removed from the incidence optical path of the collimator lens 213 disposed at the emission side using, for example, a slit panel. When the signal is on, the GLV is driven, and light made incident on the GLV 80 is reflected (diffracted) in a predetermined direction.

As a result of investigating the relation between the drive current and light intensity on the printing paper resulting from light irradiated from the light source 211B, which is the B laser light source, it was confirmed that light intensity on the printing paper resulting from the EL light was largely reduced even in the present embodiment in which the GLV was used as the diffraction unit.

As described above, in the present embodiment, the GaN LD was used in the B laser light source (laser light source 211B). Because EL light included in the output light of the GaN LD can be largely reduced using the GLV, a pattern in which the contour thereof is unclear on the printing paper due to the EL light is not formed. For this reason, it is possible to expose the printing paper at a laser spot whose contour is sharp, and it possible to obtain a high-resolution image having excellent sharpness.

Because the GaN LD is continuously oscillated and externally modulated by the GLV without being modulated by altering the current intensity applied to the GaN LD, it is possible to always activate the GaN LD in a high light output state and to reduce EL light. Moreover, because the GLV functions as both a diffraction optical modulator and as an external modulator, the number of optical parts decreases and optical alignment becomes simple.

It should be noted that an external modulator such as an electro optic modulator (EOM) or an AOM may be disposed at the diffracted light emission side of the GLV. Also, the GaN LD may be directly modulated using only the GLV as the reflective diffraction grating.

Fifth Embodiment

The digital laboratory system pertaining to the fifth embodiment is the same as the digital laboratory system pertaining to the third embodiment, except that in the optical system of the laser printer, the B-color laser light source is not directly modulated, but laser light is modulated by an acoustooptic modulator (AOM) that is a transmittance diffraction modulator disposed with a light modulating function as a diffraction unit. Therefore, description of the same parts will be omitted, and description will be given only of the different points.

Figure 26:
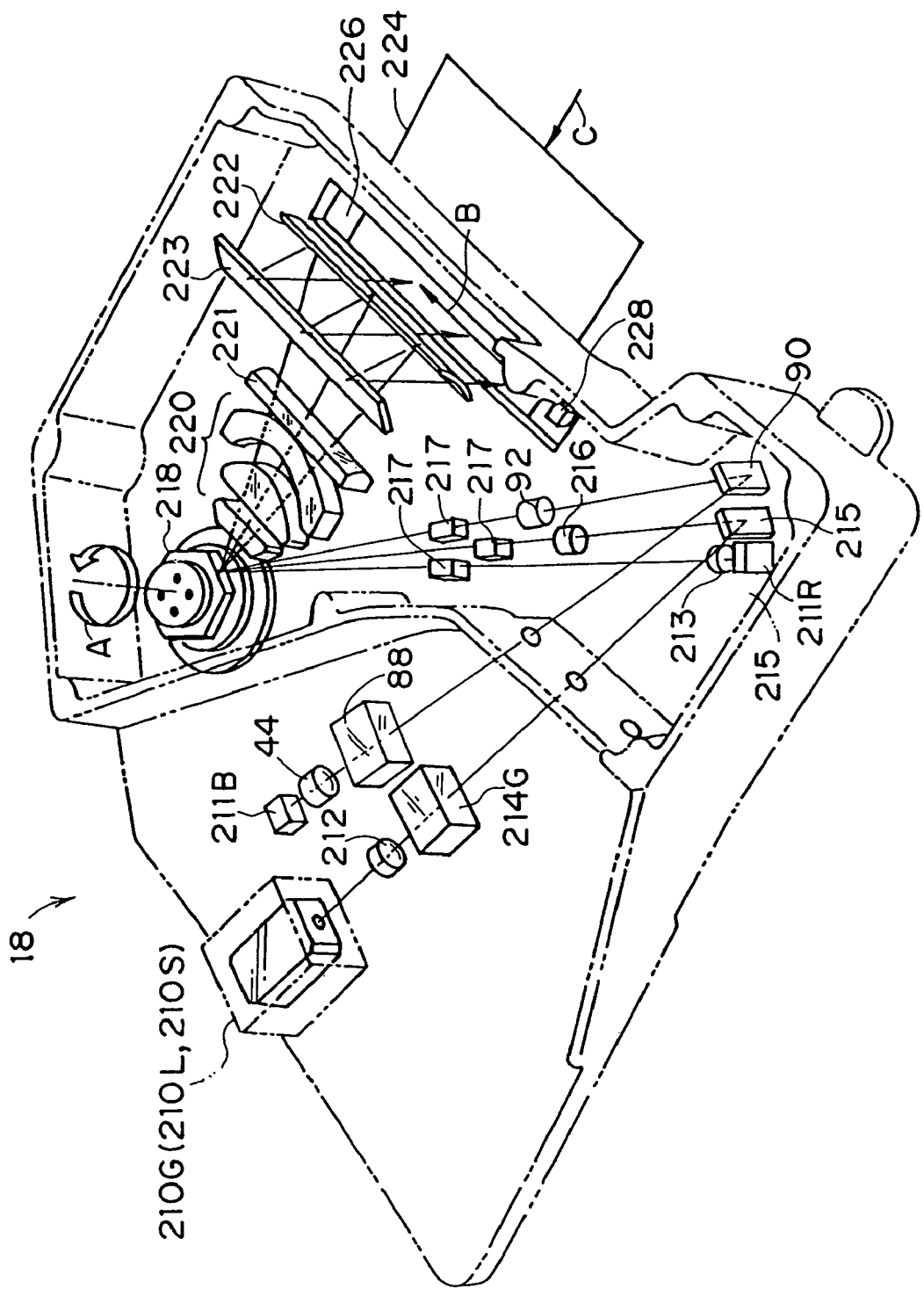
FIG. 26 is an oblique perspective view showing the structure of an optical system in a laser printer of a digital laboratory system pertaining to a fifth embodiment of the invention.

As shown in FIG. 26, the collimator lens 44 and an AOM 88 are successively disposed at the laser light emission side of the laser light source 211B comprising the GaN LD. Light emitted from the laser light source 211B is collimated by the collimator lens 44 and irradiated on a surface of the AOM 88. The AOM 88 is disposed so that laser light made incident thereon is transmitted through an acoustooptic medium, and is connected to an AOM driver (not illustrated).

Figure 27:
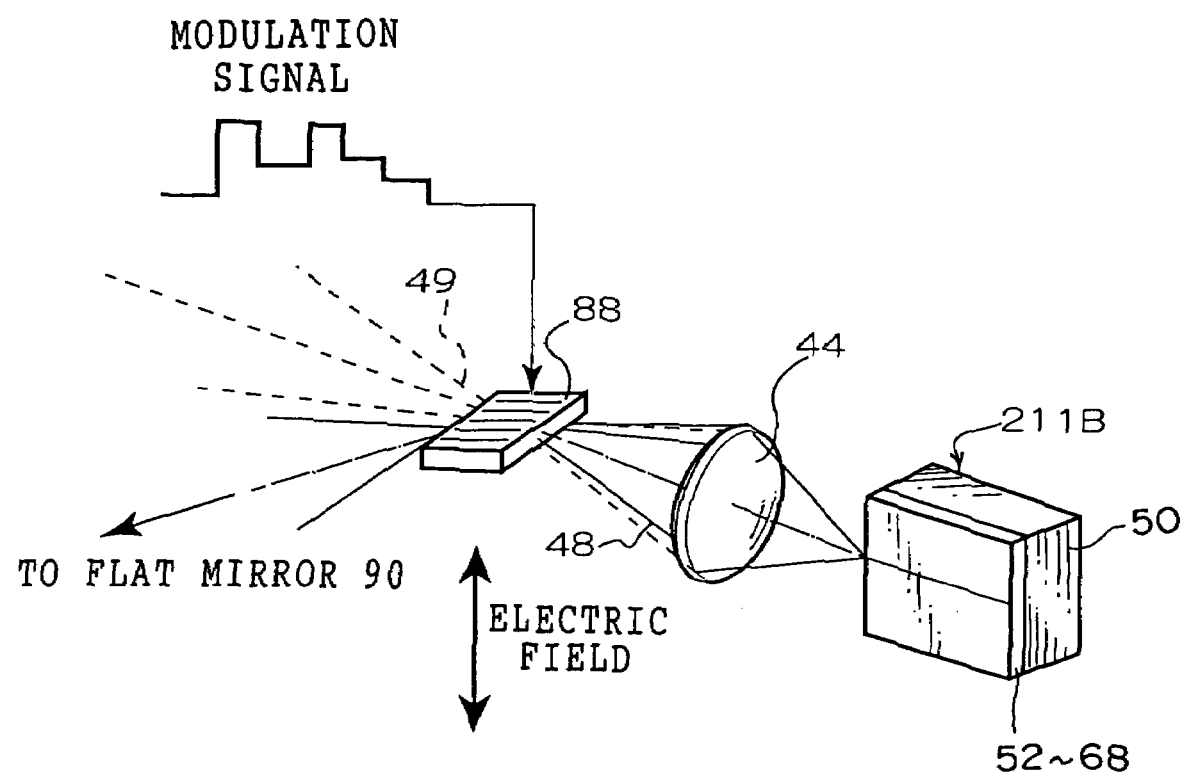
FIG. 27 is an oblique perspective view showing a structure for separating EL light from output light of a B-color laser light source in the laser printer shown in FIG. 26.
Figure 28A:
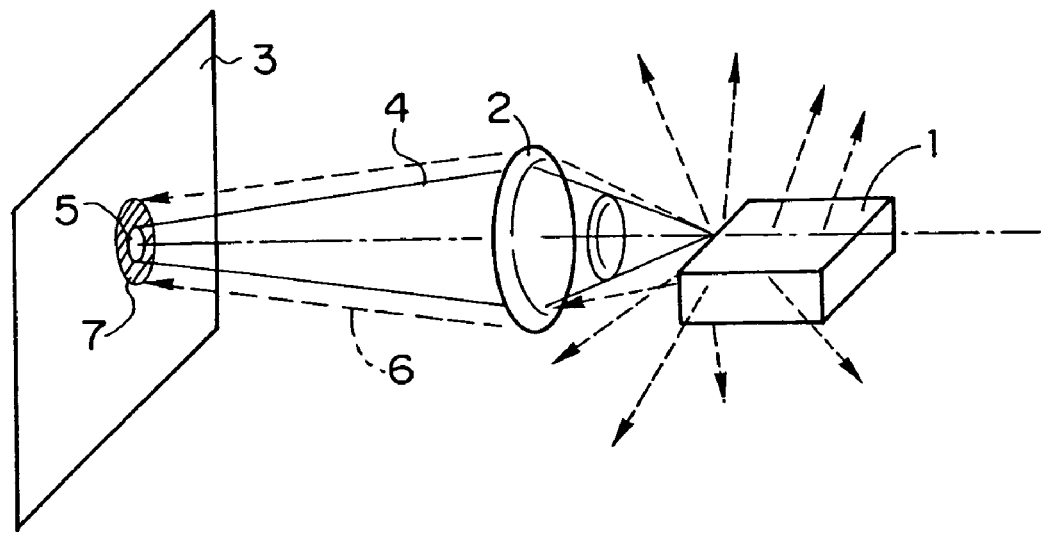
FIG. 28A is an oblique perspective view showing a printing paper being scanned by a conventional exposure device using a GaN based semiconductor laser.
Figure 28B:
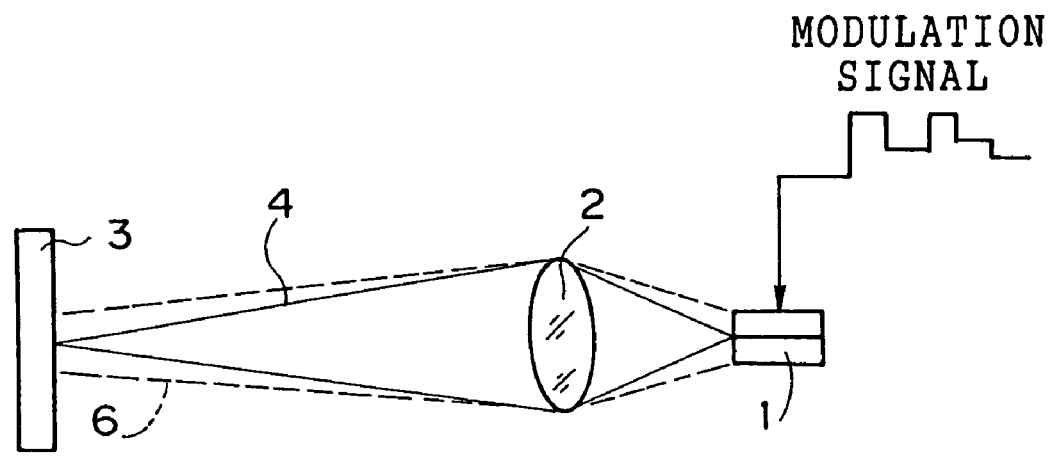
FIG. 28B is a cross sectional view along an optical axis of FIG. 28A.
Figure 29:
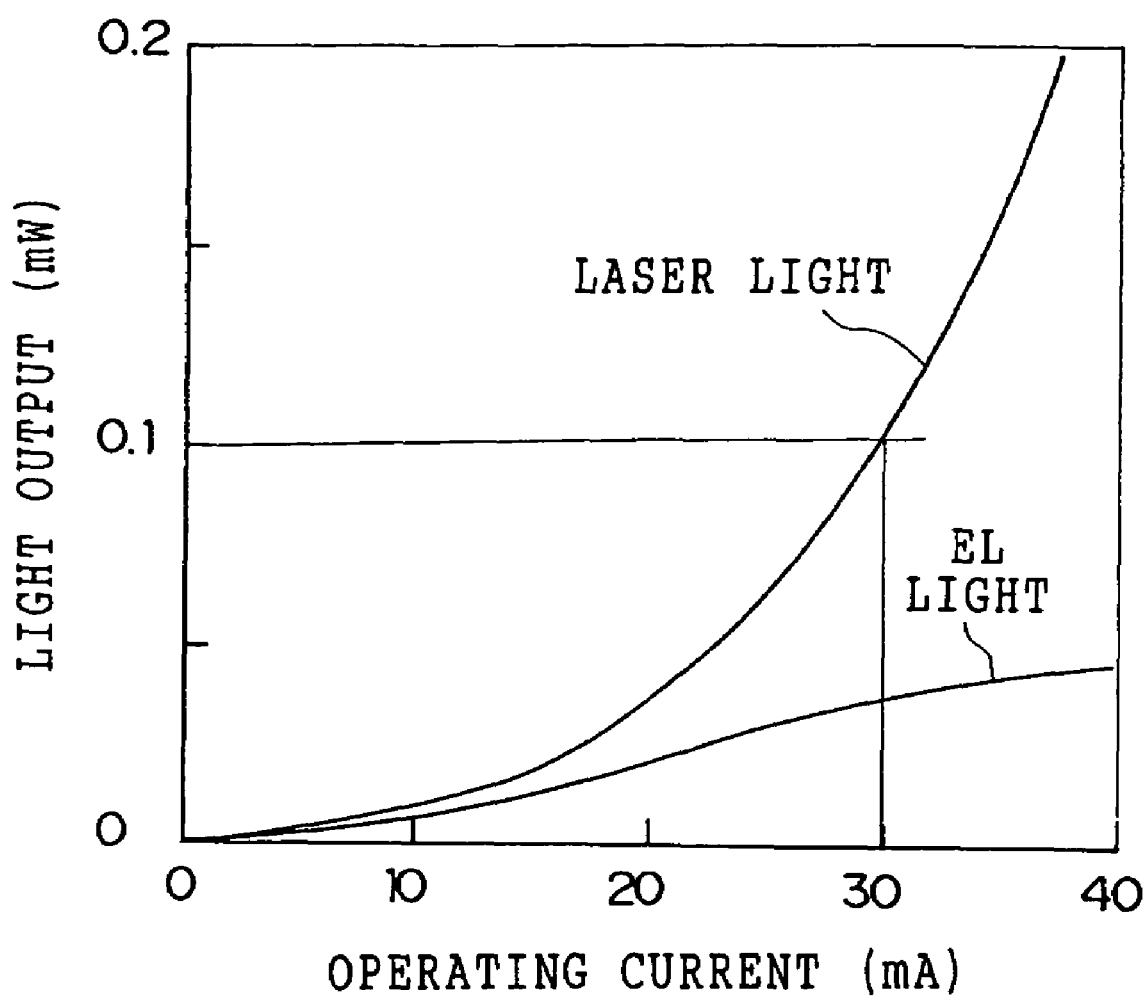
FIG. 29 is a graph showing the relation between a drive current and light strength on a printing paper due to output light from the GaN based semiconductor laser.
Figure 30A:
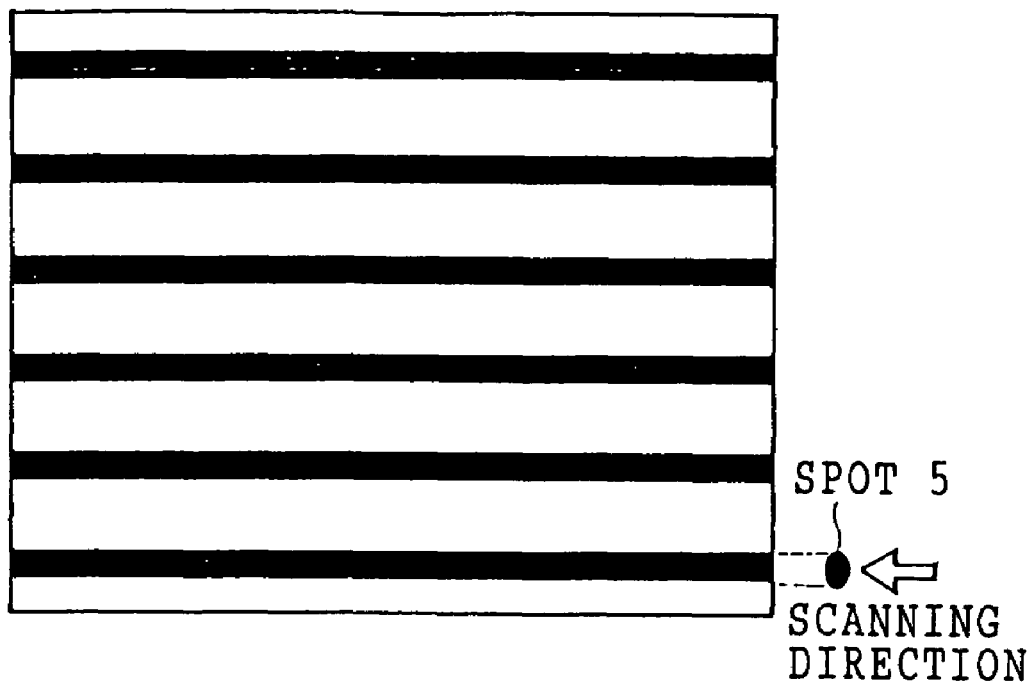
FIG. 30A is a view showing a striped pattern with a line width that is the same as a diameter of a laser spot.
Figure 30B:
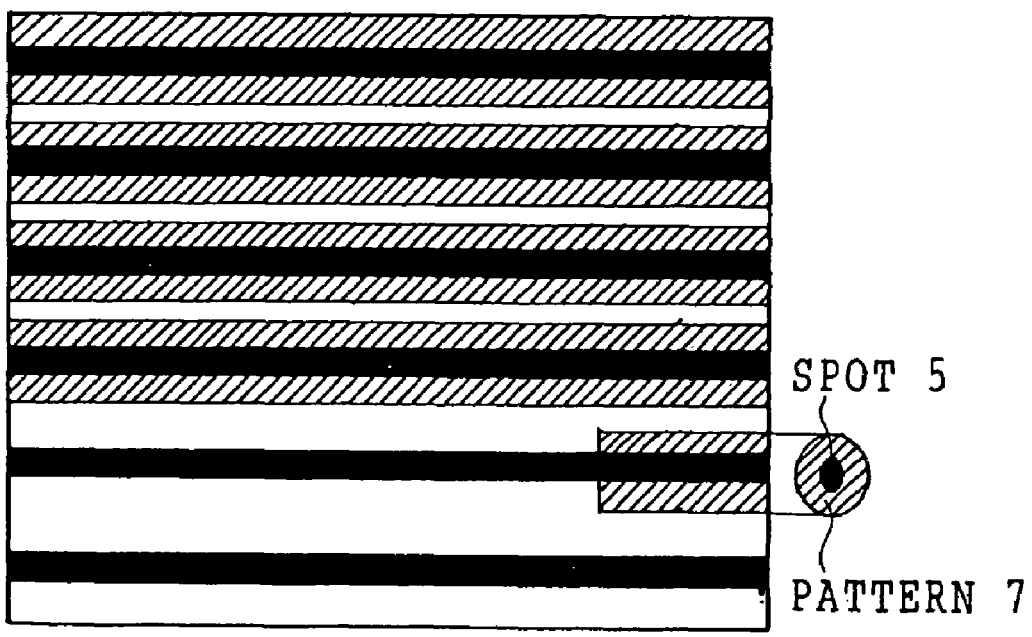
FIG. 30B is a view showing an image when the pattern of FIG. 30A is scanned using a conventional exposure device using a GaN based semiconductor laser.

As shown in FIG. 27, when a modulation signal is inputted from the AOM driver (not illustrated), the laser light 48 that has been oscillated at a predetermined wavelength from the laser light source 211B is modulated at the AOM 88 in response to an input signal due to an acoustooptic effect and diffracted in a predetermined direction. The EL light 49 is transmitted as it is, hardly without being diffracted and without relation to the input signal. Also, because the EL light 49 is light that is originally spatially dispersed, it is not made incident at modulation regions in which the thickness is only substantially 0.5 mm or less. Thus, it is possible to separate and remove most of the EL light included in the output light of the laser light source 211B.

A flat mirror 90 is disposed at the diffracted light emission side of the AOM 88. A spherical lens 92, a cylindrical lens 217, and a polygon mirror 218 are successively disposed at the laser light emission side of the flat mirror 90. B laser light emitted as diffracted light from the AOM 88 is reflected by the flat mirror 90, reflected to a predetermined position on a reflective surface of the polygon mirror 218 via the spherical lens 92 and the cylindrical lens 217, and then reflected at the polygon mirror 218.

The substantial thickness of the AOM used as the diffraction unit is about 0.05 mm to 1.0 mm. When a highly sensitive silver halide photosensitive material is used, it is preferable for the thickness to be 0.5 mm or less in order to obtain a high-resolution image. The reason the refractive index of the material is altered by sound waves in the AOM and an optical diffraction grating is formed is believed to stem from the thickness being 1.0 mm or less from the surface. When the substantial thickness of the AOM is roughly less than 0.05 mm, a sufficient diffraction effects cannot be obtained. As shown in FIG. 27, diffraction efficiency reaches a maximum as a result of the electric field being made directly incident on the AOM modulator. The electric field is formed so that it faces a direction parallel to a bonded surface of the laser modulator. Therefore, it is preferable to dispose the laser modulator and the optical system so that the electric field is substantially orthogonal to the AOM modulator.

As described in the third embodiment, the laser light source 211B is a GaN LD comprising the sapphire substrate 50 having successively disposed thereon the n-GaN substrate layer 52, the n-GaN buffer layer 54, the n-$In_{0.1}Ga_{0.9}N$ buffer layer 56, the n-$Al_{0.1}Ga_{0.9}N$ cladding layer 58, the n-GaN guide layer 60, the undoped active layer 62, the p-GaN guide layer 64, the p-$Al_{0.1}Ga_{0.9}N$ cladding layer 66, and the p-GaN capping layer 68. Each semiconductor layer can be formed by epitaxial growth.

As a result of investigating the relation between the drive current and light intensity on the printing paper resulting from light irradiated from the light source 211B, which is the B laser light source, it was confirmed that light intensity on the printing paper resulting from the EL light was largely reduced even in the present embodiment in which the AOM was used as the diffraction unit.

As described above, in the present embodiment, the GaN LD was used in the B laser light source (laser light source 211B). Because it is possible to largely reduce the EL light included in the output light of the GaN LD using the AOM, a pattern in which the contour thereof is unclear on the printing paper due to the EL light is not formed. For this reason, it is possible to expose the printing paper at a laser spot whose contour is sharp, and it possible to obtain a high-resolution image having excellent sharpness.

Because the GaN LD is continuously oscillated and externally modulated by the AOM without being modulated by altering the current intensity applied to the GaN LD, there is the advantage that removal efficiency of the EL light is increased by the EL light being kicked at the AOM. Moreover, because the AOM functions as both a diffraction optical modulator and as an external modulator, the number of optical parts decreases and optical alignment becomes simple.

What is claimed is:

1. An image exposure device that uses a laser beam to scan-expose an image on photosensitive material, the image exposure device comprising:
   a GaN based semiconductor laser for emitting light that includes a laser beam and emission light other than the laser beam;
   a drive for driving the GaN based semiconductor laser so that the light is emitted at an amount that is equal to or greater than an amount necessary to be able to expose the photosensitive material even if the light is reduced; and
   a limiter for limiting the light emitted from the GaN based semiconductor laser so that the light irradiated onto the photosensitive material is of an amount necessary for exposure, the limiter being disposed in an optical path of the light that is emitted from the GaN based semiconductor laser and irradiated onto the photosensitive material.

2. The image exposure device of claim 1, wherein the drive drives the GaN based semiconductor laser at 0.5 mW or greater, and the limiter limits at least 80% of the light emitted from the GaN based semiconductor laser.

3. The image exposure device of claim 1, wherein the limiter comprises at least one of
   a density filter,
   a half mirror,
   a coated surface that is coated on the lens disposed on the optical path and limits the light, and
   a reflective coat that is coated on a mirror disposed on the optical path.

4. The exposure device of claim 1, wherein the exposure is conducted at an exposure resolution of 300 to 600 dpi.

5. The exposure device of claim 1, wherein the exposure is conducted at a scanning speed of 500-1500 in/sec.

6. A laser exposure device comprising:
   a semiconductor laser that comprises gallium nitride and emits stray light; and
   a diffraction unit for diffracting the laser light emitted from the semiconductor laser in a predetermined direction that is different from that of the stray light,
   wherein the diffraction unit diffracts the laser light emitted from the semiconductor device and spatially modulates the intensity of the diffracted light in correspondence to image data.

7. The laser exposure device of claim 6, wherein the diffraction unit spatially modulates the intensity of the diffracted light by controlling a gradient index or a shape of a diffraction groove.

8. The laser exposure device of claim 7, wherein the diffraction unit spatially modulates the intensity of the diffracted light by controlling the gradient index, and thickness of a portion at which the gradient index is formed is 0.05 mm to 1.0 mm.

9. The laser exposure device of claim 6, wherein the semiconductor laser is disposed so that an electric field faces a direction that is substantially orthogonal to an effective diffraction grating surface of the diffraction unit.

10. The laser exposure device of claim 6, further comprising a spatial modulator for spatially modulating the intensity of the diffracted light, the spatial modulator being disposed between the semiconductor laser and a photosensitive material.

11. The exposure device of claim 10, wherein the modulator modulates the diffracted light in correspondence to image data.

12. The device of claim 11 wherein the modulator modulates diffracted light to the photosensitive medium to form an image on the photosensitive material.

13. The exposure device of claim 6, said laser emitting laser light towards a photosensitive material to scan expose the photosensitive material.

14. The exposure device of claim 13, wherein the exposure is conducted at an exposure resolution of 300 to 600 dpi.

15. The exposure device of claim 13, wherein the exposure is conducted at a scanning speed of 500-1500 m/sec.

16. The device of claim 6, wherein the spatial modulation is in correspondence to image data to be formed on a photosensitive material.

* * * * *